(12) United States Patent
Lim

(10) Patent No.: US 12,314,515 B2
(45) Date of Patent: May 27, 2025

(54) TOUCH DISPLAY DEVICE

(71) Applicant: LG Display Co., Ltd., Seoul (KR)

(72) Inventor: JungBum Lim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/075,265

(22) Filed: Dec. 5, 2022

(65) Prior Publication Data
US 2023/0205367 A1   Jun. 29, 2023

(30) Foreign Application Priority Data

Dec. 23, 2021   (KR) ........................ 10-2021-0186393

(51) Int. Cl.
| | | |
|---|---|---|
| *G06F 3/041* | (2006.01) | |
| *G02F 1/1333* | (2006.01) | |
| *G02F 1/1339* | (2006.01) | |
| *G02F 1/1362* | (2006.01) | |
| *G02F 1/1368* | (2006.01) | |

(Continued)

(52) U.S. Cl.
CPC ...... *G06F 3/04184* (2019.05); *G02F 1/13338* (2013.01); *G02F 1/136286* (2013.01); *G06F 3/0412* (2013.01); *G06F 3/0446* (2019.05); *G09G 3/2096* (2013.01); *G09G 3/3674* (2013.01); *G02F 1/1339* (2013.01); *G02F 1/1368* (2013.01); *G06F 2203/04107* (2013.01); *G09G 2354/00* (2013.01)

(58) Field of Classification Search
None
See application file for complete search history.

(56) References Cited

U.S. PATENT DOCUMENTS

| | | |
|---|---|---|
| 6,633,270 B2 | 10/2003 | Hashimoto |
| 10,510,627 B2 | 12/2019 | Park et al. |

(Continued)

FOREIGN PATENT DOCUMENTS

| | | |
|---|---|---|
| JP | 2002-040961 A | 2/2002 |
| JP | 2009-175709 A | 8/2009 |

(Continued)

OTHER PUBLICATIONS

Intellectual Property Office of the United Kingdom, Combined Search and Examination Report, United Kingdom Patent Application No. GB2218940.1, Jun. 20, 2023, six pages.

(Continued)

*Primary Examiner* — Christopher R Lamb
(74) *Attorney, Agent, or Firm* — Fenwick & West LLP

(57) ABSTRACT

A touch display device is disclosed that. has enhanced touch sensing accuracy in its periphery area. The touch display device comprises: a display panel including data lines, gate lines, subpixels, and touch electrodes that overlap a subpixel; a touch power circuit configured to generate and output a signal pulse width that is modulated; a gate driving circuit configured to supply a scan signal to the gate lines; a display controller configured to output a gate driving circuit control signal that controls controlling a driving timing of the gate driving circuit; a first line in a non-display area of the display panel that receives the gate driving circuit control signal; and a second line in the non-display area that receives the signal pulse width, wherein a width of the second line is larger than a width of the first line.

23 Claims, 25 Drawing Sheets

(51) Int. Cl.
    *G06F 3/044*     (2006.01)
    *G09G 3/20*     (2006.01)
    *G09G 3/36*     (2006.01)

(56) References Cited

U.S. PATENT DOCUMENTS

| | | |
|---|---|---|
| 10,943,840 B2 | 3/2021 | Park et al. |
| 11,502,007 B2 | 11/2022 | Park et al. |
| 2002/0011976 A1 | 1/2002 | Hashimoto |
| 2008/0158183 A1 | 7/2008 | Hotelling et al. |
| 2009/0185276 A1 | 7/2009 | Matsuhira |
| 2016/0070130 A1* | 3/2016 | Yuminami .......... G02F 1/13452 |
| | | 349/110 |
| 2016/0365367 A1 | 12/2016 | Kimura et al. |
| 2017/0090629 A1 | 3/2017 | Kim et al. |
| 2017/0345845 A1* | 11/2017 | Wu .................... H01L 27/124 |
| 2018/0090398 A1 | 3/2018 | Park et al. |
| 2019/0129549 A1* | 5/2019 | Yeh .................... G02F 1/1368 |
| 2020/0144137 A1 | 5/2020 | Park et al. |
| 2021/0210394 A1 | 7/2021 | Park et al. |
| 2023/0070117 A1 | 3/2023 | Park et al. |

FOREIGN PATENT DOCUMENTS

| | | |
|---|---|---|
| JP | 2017-003976 A | 1/2017 |
| JP | 2018-055099 A | 4/2018 |

OTHER PUBLICATIONS

The Japan Patent Office, Office Action, Japanese Patent Application No. 2022-205382, Feb. 6, 2024, 10 pages.

\* cited by examiner

TDS

(Case 1)    TDS1

(Case 2)    TDS2

(Case 3)    TDS3

TOUCH DISPLAY DEVICE

CROSS-REFERENCE TO RELATED APPLICATION

This application claims priority from Republic of Korea Patent Application No. 10-2021-0186393, filed on Dec. 23, 2021, which is hereby incorporated by reference in its entirety.

BACKGROUND

Field

Embodiments of the disclosure relate to touch display devices.

Description of Related Art

The growth of the information society leads to various needs for touch display devices. Recently, various display devices are being used, such as liquid crystal displays and organic light emitting display devices.

Among others, touch display devices provide an input scheme that allows users easier and more intuitive and convenient entry of information or commands without the need for buttons, a keyboard, a mouse, or other typical input means.

SUMMARY

Embodiments of the disclosure may provide a touch display device with enhanced accuracy of touch sensing in its periphery area.

In one embodiment, a touch display device comprises: a display panel including a plurality of data lines, a plurality of gate lines, a plurality of subpixels in a display area of the display panel, and a plurality of touch electrodes that overlap at least one subpixel from the plurality of subpixels; a touch power circuit configured to generate and output a signal pulse width that is modulated according to a voltage pulse, the voltage pulse corresponding to an input pulse width modulation signal; a gate driving circuit configured to supply a scan signal to the plurality of gate lines; a display controller configured to output a gate driving circuit control signal, the gate driving circuit control signal controlling a driving timing of the gate driving circuit; a first line in a non-display area of the display panel, the first line receiving the gate driving circuit control signal; and a second line in the non-display area, the second line receiving the signal pulse width, wherein a width of the second line is larger than a width of the first line.

In one embodiment, a touch display device comprises: a display panel including a plurality of data lines, a plurality of gate lines, a plurality of subpixels in a display area of the display panel, and a plurality of touch electrodes that overlap at least one subpixel from the plurality of subpixels; one or more signal generating circuits configured to generate a first signal for display driving during a display period that is not pulse width modulated and one or more second signals that are pulse width modulated for touch sensing during a touch sensing period and the display driving during the display period; a first line in a non-display area of the display panel, the first line receiving the first signal that is not pulse width modulated; and a second line in the non-display area of the display panel, the second line receiving a second signal from the one or more second signals that is pulse width modulated, wherein a width of the second line is wider than a width of the first line.

According to embodiments of the disclosure, there may be provided a touch display device with enhanced accuracy of touch sensing in its periphery area.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
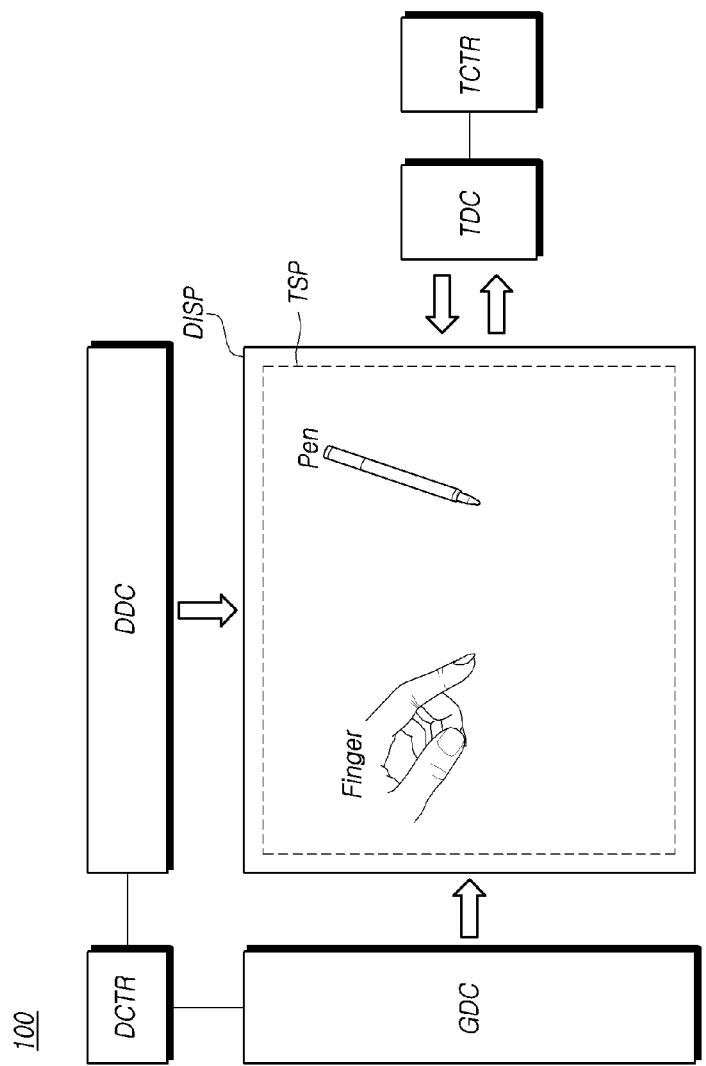
FIG. 1 is a view schematically illustrating a system configuration of a touch display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure are described in detail with reference to the accompanying drawings.

Figure 2:
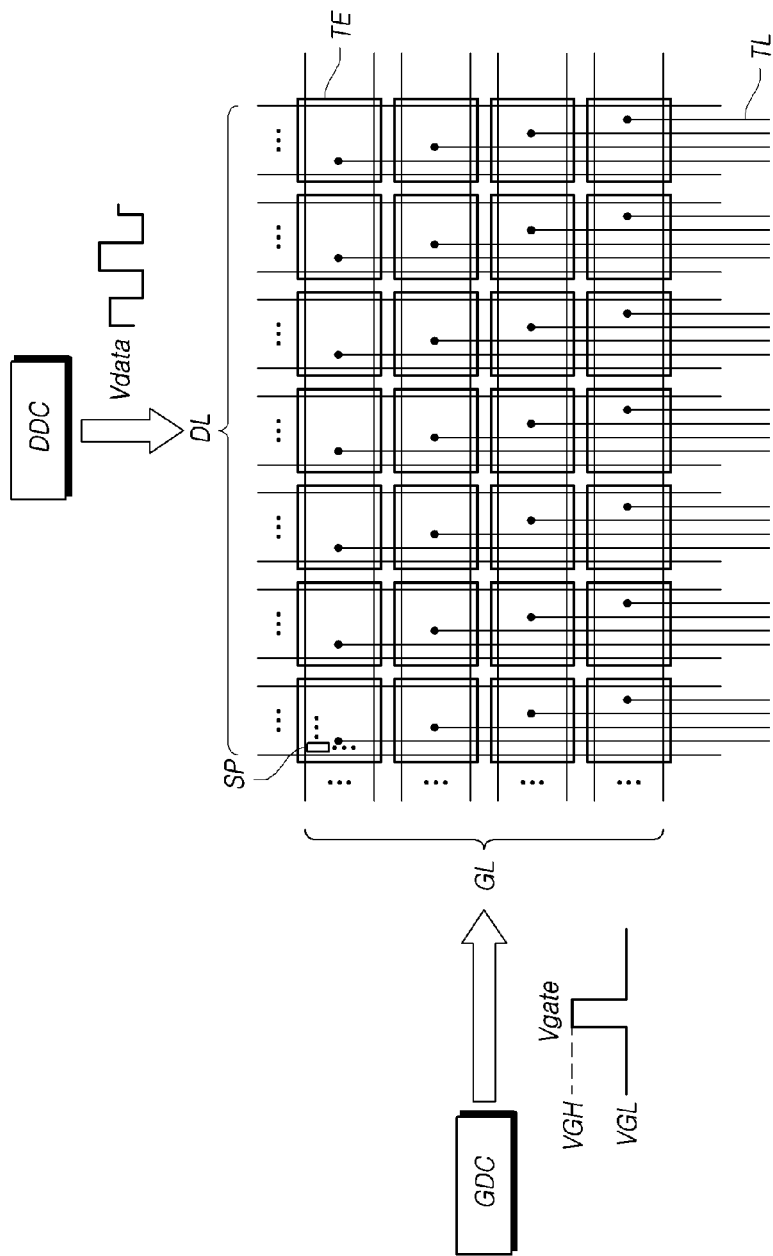
FIG. 2 is a view schematically illustrating display driving of a touch display device according to embodiments of the disclosure.
Figure 3:
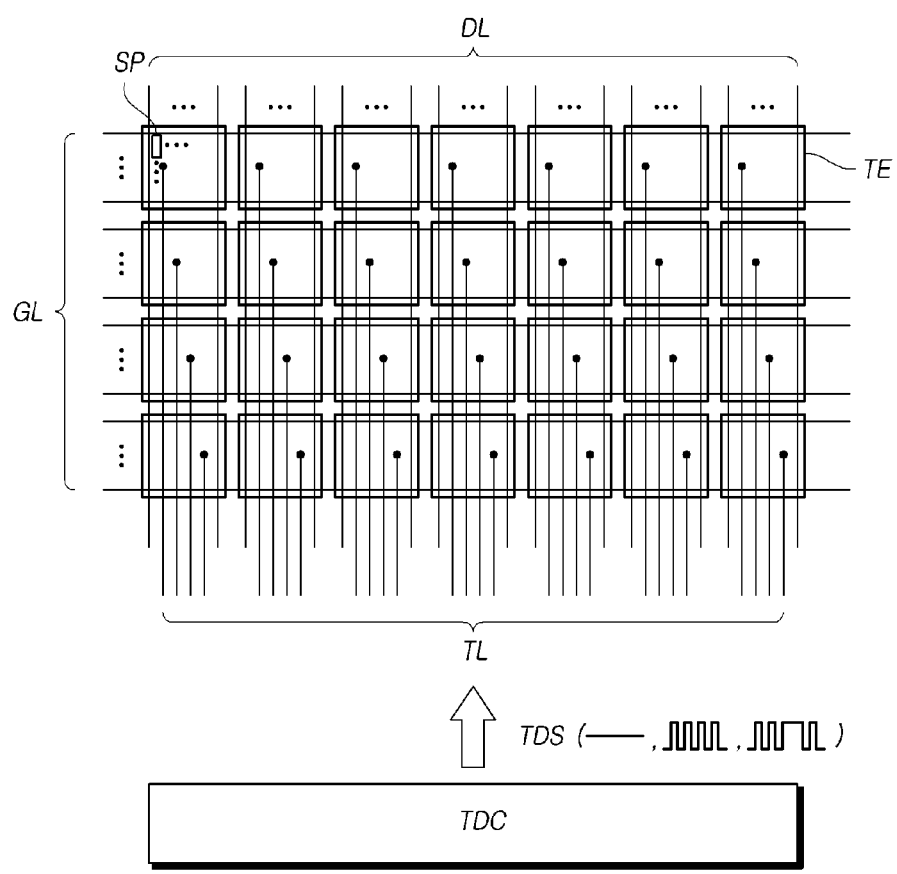
FIG. 3 is a view schematically illustrating touch driving of a touch display device according to embodiments of the disclosure.

FIG. 1 is a view schematically illustrating a system configuration of a touch display device 100 according to embodiments of the disclosure. FIG. 2 is a view schematically illustrating display driving of a touch display device 100 according to embodiments of the disclosure. FIG. 3 is a view schematically illustrating touch driving of a touch display device 100 according to embodiments of the disclosure.

Referring to FIG. 1, a touch display device 100 according to embodiments of the disclosure may provide a display function for displaying an image. The touch display device 100 according to embodiments of the disclosure may provide a touch sensing function for sensing the user's touch and a touch input function for performing input processing according to the user's touch based on the result of the touch sensing function.

Hereinafter, display driving for providing the display function is described with reference to FIGS. 1 and 2, and components and touch driving for providing the touch sensing function are described with reference to FIGS. 1 and 3.

Referring to FIGS. 1 and 2, the touch display device 100 according to embodiments of the disclosure may include a display panel DISP in which a plurality of data lines DL and a plurality of gate lines GL are positioned to provide the display function. A plurality of subpixels SP connected with the plurality of data lines DL and the plurality of gate lines GL may be disposed on the display panel DISP. The touch display device 100 according to embodiments of the disclosure may include a display panel DISP, a data driving circuit DDC configured to drive a plurality of data lines DL, a gate driving circuit GDC configured to drive a plurality of gate lines GL, and a display controller DCTR configured to control the data driving circuit DDC, and the gate driving circuit GDC.

The display controller DCTR may supply various control signals to the data driving circuit DDC and the gate driving circuit GDC to control the data driving circuit DDC and the gate driving circuit GDC.

As an example, to control the gate driving circuit GDC, the display controller DCTR outputs various gate driving circuit control signals GCS including a gate start pulse GSP, a gate shift clock GSC, and a gate output enable signal GOE. In one embodiment, gate signals are generated by the gate driving circuit GDC in accordance with the gate driving circuit control signals GCS.

To control the data driving circuit DDC, the display controller DCTR outputs various data driving circuit control signals DCS including, for example, a source start pulse SSP, a source sampling clock SSC, and a source output enable (SOE) signal.

The display controller DCTR may start scanning according to the timings in each frame, converts image data input from the outside to fit into the data signal format used in the data driving circuit DDC, output the converted-into image data, and control data driving at proper times according to scanning.

The gate driving circuit GDC sequentially supplies scan signals (e.g., gate signals) of on voltage or off voltage to the plurality of gate lines GL under the control of the display controller DCTR based on the gate driving circuit control signals GCS.

When a specific gate line GL is opened by the gate driving circuit GDC, the data driving circuit DDC converts image data signals received from the display controller DCTR into analog signals and supplies data signals Vdata corresponding to the image analog signals to the multiple data lines DL.

The display controller DCTR may be a timing controller used in typical display technology, a control device that performs other control functions as well as the functions of the timing controller, or a control device other than the timing controller.

The display controller DCTR may be implemented as a separate component from the data driving circuit DDC, or the display controller DCTR, along with the data driving circuit DDC, may be implemented as an integrated circuit.

The data driving circuit DDC drives multiple data lines DL by supplying data signals Vdata to multiple data lines DL. Here, data driving circuit DDC is also referred to as a 'source driver.'

The data driving circuit DDC may include at least one source driver integrated circuits SDIC. Each source driver integrated circuit SDIC may include a shift register, a latch circuit, a digital-to-analog converter DAC, and an output buffer circuit. In some cases, each source driver integrated circuit SDIC may further include an analog-digital converter ADC.

Each source driver integrated circuit SDIC may be connected to the bonding pad of the display panel DISP in a tape automated bonding (TAB) or chip-on-glass (COG) scheme or may be directly disposed on the display panel DISP or, in some cases, may be integrated in the display panel DISP. Each source driver integrated circuit SDIC may also be implemented in a chip-on-film (COF) scheme to be mounted on a film connected to the display panel DISP.

The gate driving circuit GDC drives the plurality of gate lines GL by supplying a scan signal Vgate (also referred to as a scan voltage, a scan signal, or a gate voltage) to the plurality of gate lines GL. Here, gate driving circuit GDC is also referred to as a 'scan driver.'

Here, the scan signal Vgate may include an off-level gate voltage to allow the gate line GL to close and an on-level gate voltage to allow the gate line GL to open.

More specifically, the scan signal Vgate may include an off-level gate voltage that turns off the transistor connected to the corresponding gate line GL and an on-level gate voltage that turns on the transistor connected to the corresponding gate line GL.

When the transistor is of an N-type, the off-level gate voltage may be a low-level gate voltage VGL, and the on-level gate voltage may be a high-level gate voltage VGH that is greater than the off-level gate voltage. When the transistor is of a P-type, the off-level gate voltage may be a high-level gate voltage VGH, and the on-level gate voltage may be a low-level gate voltage VGL that is less than the high-level gate voltage. For convenience of description, in the following description, the off-level gate voltage is the low-level gate voltage VGL, and the on-level gate voltage is the high-level gate voltage VGH.

The gate driving circuit GDC may include at least one gate driver integrated circuits GDIC. Each gate driver integrated circuit GDIC may include, e.g., a shift register and a level shifter.

Each gate driver integrated circuit GDIC may be connected to the bonding pad of the display panel DISP in a tape automated bonding (TAB) or chip-on-glass (COG) scheme or may be implemented in a gate-in-panel (GIP) type to be directly disposed on the display panel DISP or, in some cases, may be integrated in the display panel DISP. Each gate driver integrated circuit GDIC may also be implemented in a chip-on-film (COF) scheme to be mounted on a film connected to the display panel DISP.

The data driving circuit DDC may be positioned on only one side (e.g., the top or bottom side) of the display panel DISP as shown in FIG. 1 and, in some cases, the data driving circuit DDC may be positioned on each of two opposite sides (e.g., both the top and bottom sides) of the display panel DISP depending on driving schemes or panel designs.

The gate driving circuit GDC may be positioned on only one side (e.g., the left or right side) of the display panel DISP as shown in FIG. 1 and, in some cases, the gate driving circuit GDC may be positioned on each of two opposite sides (e.g., both the left and right sides) of the display panel DISP depending on driving schemes or panel designs.

The touch display device 100 according to embodiments of the disclosure may be a display device in various types, such as a liquid crystal display device and an organic light emitting display device. The display panel DISP according to embodiments of the disclosure may also be a display panel in various types, such as a liquid crystal display panel and an organic light emitting display panel.

Each subpixel SP positioned on the display panel DISP may include one or more circuit elements (e.g., transistors or capacitors).

For example, when the display panel DISP is a liquid crystal display panel, each subpixel SP may include a pixel electrode and a transistor electrically connected between the pixel electrode and the data line DL. The transistor may be turned on by the scan signal Vgate supplied to the gate node through the gate line GL and, when turned on, outputs the data signal Vdata supplied to the source node (or drain node) through the data line DL to the drain node (or source node). The transistor may apply the data signal Vdata to the pixel electrode electrically connected to the drain node (or the source node). An electric field may be created between the pixel electrode supplied the data signal Vdata and the common electrode supplied the common voltage Vcom, and a capacitance may be created between the pixel electrode and the common electrode.

The structure of each subpixel SP may be varied depending on panel types, functions provided, and design schemes.

Referring to FIGS. 1 and 3, the touch display device 100 according to embodiments of the disclosure may include a touch panel TSP, a touch driving circuit TDC for driving and sensing the touch panel TSP, and a touch controller TCTR for detecting the presence or absence of a touch and/or the coordinates of a touch using the result of sensing the touch panel TSP by the touch driving circuit TDC, to provide a touch sensing function.

The touch panel TSP may be touched or approached by the user's pointer. Touch sensors may be disposed on the touch panel TSP.

The user's pointer may be a finger or a pen in one embodiment.

The pen may be a passive pen having no signal transmission/reception function or an active pen having a signal transmission/reception function. The touch driving circuit TDC may supply a touch driving signal to the touch panel TSP and sense the touch panel TSP. The touch controller TCTR may sense the touch using the result of sensing the touch panel TSP by the touch driving circuit TDC. Sensing the touch may mean detecting the presence or absence of a touch and/or the coordinates of a touch.

The touch panel TSP may be of an external type in which it is disposed outside the display panel DISP or may be of a built-in type in which it is disposed inside the display panel DISP.

When the touch panel TSP is of the external type, the touch panel TSP and the display panel DISP may be separately manufactured and then joined by an adhesive or the like. The external-type touch panel TSP is also referred to as an add-on type.

When the touch panel TSP is of the built-in type, the touch panel TSP may be manufactured together during the process of manufacturing the display panel DISP. In other words, the touch sensors constituting the touch panel TSP may be disposed inside the display panel DISP. The built-in touch panel TSP may be of an in-cell type, an on-cell type, or a hybrid type.

In the following description, for convenience of description, it is assumed that the touch panel TSP is of a built-in type in which the touch panel TSP is embedded in the display panel DISP.

When the touch panel TSP is embedded in the display panel DISP, that is, when a plurality of touch electrodes TE are disposed on the display panel DISP, the plurality of touch electrodes TE may be configured on the display panel DISP, separately from the electrodes used for display driving, and the electrodes disposed on the display panel DISP for display driving may be used as a plurality of touch electrodes TE.

For example, the common electrode disposed on the display panel DISP may be split into a plurality of pieces to be used as the plurality of touch electrodes TE. In other words, the plurality of touch electrodes TE disposed on the display panel DISP may be electrodes for touch sensing and electrodes for display driving. Hereinafter, it is assumed that the plurality of touch electrodes TE disposed on the display panel DISP are common electrodes.

The touch controller TCTR may be implemented as, for example, a micro control unit (MCU), a processor, or the like.

The display controller DCTR and the touch controller TCTR may be implemented separately or may be integrated.

Referring to FIG. 3, the touch panel TSP of the touch display device 100 according to embodiments of the disclosure may include a plurality of touch electrodes TE and a plurality of touch lines TL configured to electrically connect the plurality of touch electrodes TE with the touch driving circuit TDC. The plurality of touch electrodes TE may be disposed in a matrix form. Each of the plurality of touch electrodes TE may be electrically connected to one or more touch lines TL through one or more contact holes.

The touch display device 100 according to embodiments of the disclosure may sense the touch based on the self-capacitance of the touch electrode TE or based on the mutual-capacitance between the touch electrodes TE.

When the touch display device 100 according to embodiments of the disclosure senses the touch based on self-capacitance, the touch panel TSP may include a plurality of first touch electrode lines and a plurality of second touch electrode lines that cross each other. For example, the plurality of first touch electrode lines may be disposed in an X-axis direction (e.g., a first direction), and the plurality of second touch electrode lines may be disposed in a Y-axis direction (e.g., a second direction). Each of the first touch electrode line and the second touch electrode line may be one bar-shaped touch electrode or may have a form in which two or more touch electrodes are electrically connected. The first touch electrode lines may be referred to as driving lines, driving electrodes, driving touch electrode lines, Tx lines, Tx electrodes, or Tx touch electrode lines. The second touch electrode lines may be referred to as reception lines, reception electrodes, reception touch electrode lines, sensing lines, sensing electrodes, sensing touch electrode lines, Rx lines, Rx electrodes, or Rx touch electrode lines.

In this case, the touch driving circuit TDC may supply a driving signal to one or more of the plurality of first touch electrode lines and sense the second touch electrode lines to output sensing data, and the touch controller TCTR may calculate the presence or absence of a touch and/or the coordinates of a touch using the sensing data.

When the touch display device 100 according to embodiments of the disclosure senses a touch based on the mutual-capacitance, a plurality of touch electrodes TE may be disposed on the touch panel TSP to be separated from each other as shown in FIG. 3.

In this case, the touch driving circuit TDC may supply a driving signal (hereinafter, referred to as a touch electrode driving signal TDS) to all or some of the plurality of touch electrodes TE and sense one or more touch electrodes TE to which the driving signal has been supplied to output sensing data, and the touch controller TCTR may calculate the presence or absence of a touch and/or the coordinates of a touch using the sensing data.

Hereinafter, for convenience of description, it may be assumed that the touch display device according to embodiments of the disclosure senses a touch based on self-capacitance and that the touch panel TSP is configured as shown in FIGS. 2 and 3.

The touch electrode driving signal TDS output from the touch driving circuit TDC may be a signal having a constant voltage or a signal with a variable voltage.

When the touch electrode driving signal TDS is a signal with a variable voltage, the touch electrode driving signal TDS may have various signal waveforms, such as, for example, a sinusoidal wave shape, a triangular wave shape, or a square wave shape.

It is assumed below that when the touch electrode driving signal TDS is a signal with a variable voltage, the touch electrode driving signal TDS is a pulse signal composed of several pulses. When the touch electrode driving signal TDS is a pulse signal composed of several pulses, the touch electrode driving signal TDS may have a constant frequency or a variable frequency.

Referring to FIGS. 2 and 3, the size of the area occupied by one touch electrode TE may correspond to the size of the area occupied by one subpixel SP or may correspond to the size of the area occupied by two or more subpixels SP. In other words, each of the plurality of touch electrodes TE may overlap two or more subpixels SP.

When the plurality of touch electrodes TE are disposed in a matrix form and, among the plurality of touch electrodes TE, a first touch electrode and a second touch electrode are disposed in the same column (or the same row), two or more data lines DL overlapping the first touch electrode may overlap the second touch electrode. The two or more gate lines GL overlapping the first touch electrode may not overlap the second touch electrode.

The plurality of touch electrode columns (or touch electrode rows) may be disposed parallel to the plurality of data lines DL. The plurality of touch lines TL may be disposed parallel to the plurality of data lines DL.

A plurality of touch electrodes TE are disposed in one touch electrode column (or touch electrode row). The plurality of touch lines TL electrically connected to the plurality of touch electrodes TE may overlap the plurality of touch electrodes TE.

For example, it is assumed that the plurality of touch electrodes TE disposed in one touch electrode column may include a first touch electrode and a second touch electrode and that the first touch line electrically connects the first touch electrode and the touch driving circuit TDC, and the second touch line electrically connects the second touch electrode and the touch driving circuit TDC. In this case, the first touch line electrically connected to the first touch electrode may overlap the second touch electrode (a touch electrode disposed in the same column as the first touch electrode), but in the display panel DISP, may be electrically insulated (separated) from the second touch electrode. The first touch line and the second touch line may be shorted in the touch driving circuit TDC according to driving conditions or necessity.

Figure 4:
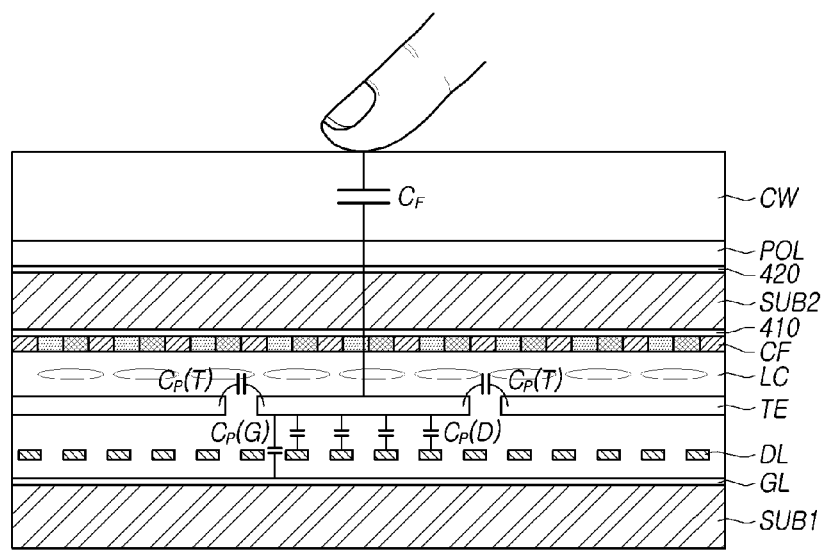
FIG. 4 is a view schematically illustrating a touch sensing method using a self-capacitance scheme according to embodiments of the disclosure.

FIG. 4 is a view schematically illustrating a touch sensing method using a self-capacitance scheme.

Referring to FIG. 4, the touch display device according to embodiments of the disclosure may include a first substrate SUB1 and a second substrate SUB2. A polarizing plate POL and a cover window CW may be further positioned on the first substrate SUB1 and the second substrate SUB2.

A plurality of data lines DL and a plurality of gate lines GL are positioned on the first substrate SUB1. The first substrate SUB1 is also referred to as a thin film transistor substrate (or an array substrate).

A color filter layer CF including a color filter and a light blocking layer 410 for separating a plurality of subpixels may be positioned on the second substrate SUB2. The second substrate SUB2 is also referred to as a color filter substrate. The color filter substrate may be bonded to the array substrate. Liquid crystal (LC) may fill the space between the array substrate and the color filter substrate.

Referring to FIG. 4, a plurality of touch electrodes TE for touch sensing are positioned on the plurality of data lines DL and the plurality of gate lines GL.

A touch electrode driving signal TDS is applied to at least one of the plurality of touch electrodes TE. As described above, the touch driving circuit may supply the touch electrode driving signal to all or some of the plurality of touch electrodes TE and sense one or more touch electrodes TE to which the touch electrode driving signal TDS has been supplied to output sensing data.

If a pointer including a human finger touches the surface of the touch display device or approaches the surface of the touch display device, the capacitance formed at the touch electrode TE changes from its initial value.

For example, referring to FIG. 4, if the finger touches the cover window CW of the touch display device, a predetermined capacitance Cf is formed between the touch electrode TE and the finger. The touch driving circuit may sense the touch electrode TE and output the sensing data, determining the presence or absence of a touch and/or the position of the touch.

To increase the accuracy of touch sensing, an insulator having a high resistance may be disposed on the touch electrode TE and the cover window CW. Accordingly, the capacitance Cf formed at the touch electrode TE may be increased. Therefore, the accuracy of touch sensing may be increased.

Referring to FIG. 4, the high-resistance insulator may be a high-resistance polarizing plate POL.

In some cases, a high-resistance oxide layer 420 (or an oxide film) may be further disposed between the touch electrode TE and the cover window CW. The high-resistance oxide layer 420 may be applied onto the upper surface of the second substrate SUB2. The upper surface of the second substrate SUB2 may mean a surface opposite to the surface on which the color filter layer CF is positioned in the second substrate SUB2. The resistance of the oxide layer 420 may be about 10^6.5Ω to 10^8.5Ω (ohm) level.

By coating a high-resistance oxide film on the upper surface of the second substrate SUB2, it may be possible to use the polarizing plate POL having a low resistance.

Accordingly, one or more insulating materials may be positioned between the touch electrode TE and the cover window CW.

Referring to FIG. 4, at least one of the liquid crystal LC, the light blocking layer 410, the high-resistance oxide layer 420, and the polarizing plate POL may be positioned between the touch electrode TE and the cover window CW.

For example, the permittivity of the liquid crystal LC may be about 8.7 (F/m). The permittivity of the light blocking layer 410 may be about 4 (F/m).

At least one touch electrode TE to which the touch electrode driving signal TDS is applied may form a parasitic capacitance Cp with its surrounding electrodes and surrounding lines.

Referring to FIG. 4, at least one touch electrode TE to which the touch electrode driving signal TDS is applied may form a parasitic capacitance Cp(T) with one or more touch electrodes TE positioned therearound. At least one touch electrode TE to which the touch electrode driving signal TDS is applied may form a data line parasitic capacitance Cp(D) with one or more data lines DL positioned therearound. At least one touch electrode TE to which the touch electrode driving signal TDS is applied may form a parasitic capacitance Cp(G) with one or more gate lines GL positioned therearound.

Figure 5:
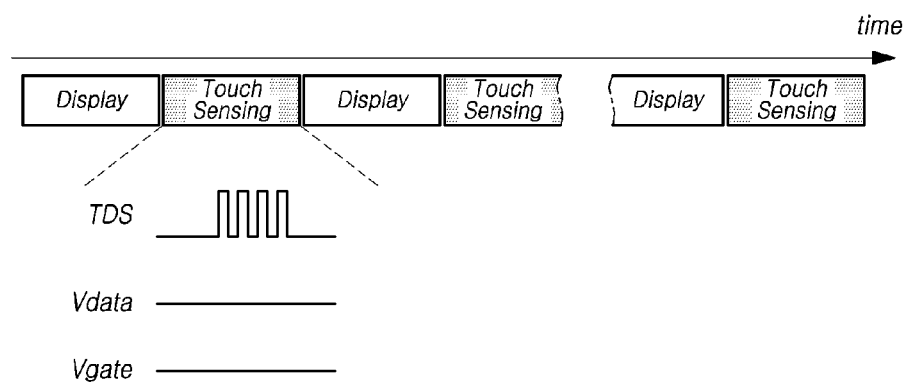
FIGS. 5 and 6 are views illustrating a time division driving scheme of a touch display device according to embodiments of the disclosure.
Figure 6:
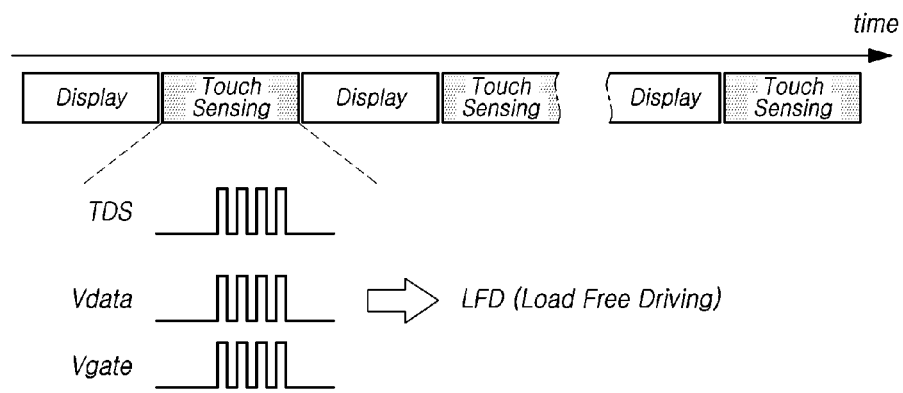

FIGS. 5 and 6 are views illustrating a time division driving (TDD) scheme of a touch display device according to embodiments of the disclosure.

Referring to FIG. 5, the touch display device according to embodiments of the disclosure may alternately perform display driving and touch sensing. As described above, a scheme in which display driving for display and touch driving for touch sensing are performed alternately is referred to as time division driving.

According to the time division driving scheme, the display period for display and the touch sensing period for touch sensing alternate. During the display period, the touch display device may perform display driving. During the touch sensing period, the touch display device may perform touch driving.

As an example of the time division driving scheme, one frame period in which an image is displayed may be divided into one display period and one touch sensing period. As another example of the time division scheme, one frame period may be divided into two or more display periods and one or more touch sensing periods.

Referring to FIG. 5, according to the time division driving scheme, a touch electrode driving signal TDS may be applied to one or more of the plurality of touch electrodes TE during the touch sensing period. In this case, the plurality of data lines DL and the plurality of gate lines GL may not be driven.

In this case, unnecessary parasitic capacitance due to a potential difference may be formed between the touch electrode TE to which the touch electrode driving signal TDS is applied and one or more data lines DL positioned around the touch electrode TE. Such unnecessary parasitic capacitance may increase a resistor-capacitor (RC) delay for the touch electrode TE and the touch line TL connected thereto, deteriorating touch sensitivity.

Further, unnecessary parasitic capacitance may be formed between the touch electrode TE to which the touch electrode driving signal TDS is applied and one or more gate lines GL positioned therearound, due to the potential difference. Such unnecessary parasitic capacitance may increase an RC delay for the touch electrode TE and the touch line TL connected thereto, deteriorating touch sensitivity.

Further, unnecessary parasitic capacitance may be formed between the touch electrode TE to which the touch electrode driving signal TDS is applied and one or more other touch electrodes TE positioned therearound, due to the potential difference. Such unnecessary parasitic capacitance may increase an RC delay for the touch electrode TE and the touch line TL connected thereto, deteriorating touch sensitivity.

The above-mentioned RC delay may also be referred to as a time constant or a load.

To remove the load, the touch display device according to embodiments of the disclosure may perform load free driving (LFD) during the touch sensing period.

The touch display device according to embodiments of the disclosure may apply a load free driving signal, as the data signal Vdata, to some data lines DL, which have a chance of causing a parasitic capacitance, or all the data lines DL when the touch electrode driving signal TDS is applied to all or some of the plurality of touch electrodes TE upon load free driving.

The touch display device according to embodiments of the disclosure may apply a load free driving signal, as the scan signal Vgate, to some gate lines GL, which have a chance of causing a parasitic capacitance, or all the gate lines GL when the touch electrode driving signal TDS is applied to all or some of the plurality of touch electrodes TE upon load free driving.

The touch display device according to embodiments of the disclosure may apply a load free driving signal to some other touch electrodes TE, which have a chance of causing a parasitic capacitance, or all the touch electrodes TE when the touch electrode driving signal TDS is applied to some of the plurality of touch electrodes TE upon load free driving.

The above-described load free driving signal may be a touch electrode driving signal or a signal having the same or similar signal characteristics to those of the touch electrode driving signal. For example, the frequency and phase of the above-described load free driving signal may be identical to, or fall within a predetermined error range from, the frequency and phase of the touch electrode driving signal TDS. The amplitude of the load-free driving signal and the amplitude of the touch electrode driving signal TDS may be identical to, or fall within a predetermined error range from, the amplitude of the touch electrode driving signal TDS and, in some cases, there may be an intended difference.

Figure 7:
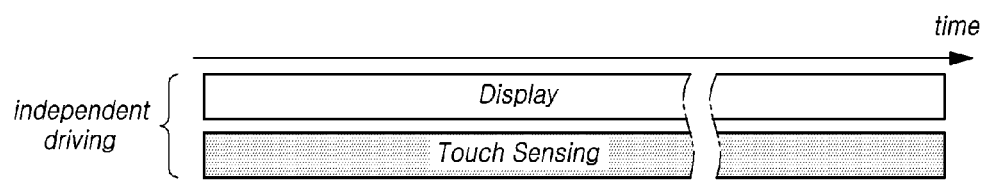
FIG. 7 is a view illustrating a time free driving scheme of a touch display device according to embodiments of the disclosure.

FIG. 7 is a view illustrating a time free driving (TFD) scheme of a touch display device according to embodiments of the disclosure.

Referring to FIG. 7, the touch display device according to embodiments of the disclosure may independently perform display driving and touch sensing. As described above, a driving scheme for independently performing display driving and touch driving for touch sensing is referred to as a time free driving scheme.

According to this time free driving scheme, the display driving for display and the touch driving for the touch sensing may proceed simultaneously. In a certain period, only the display driving for display or only the touch driving for touch sensing may be performed.

Figure 8:
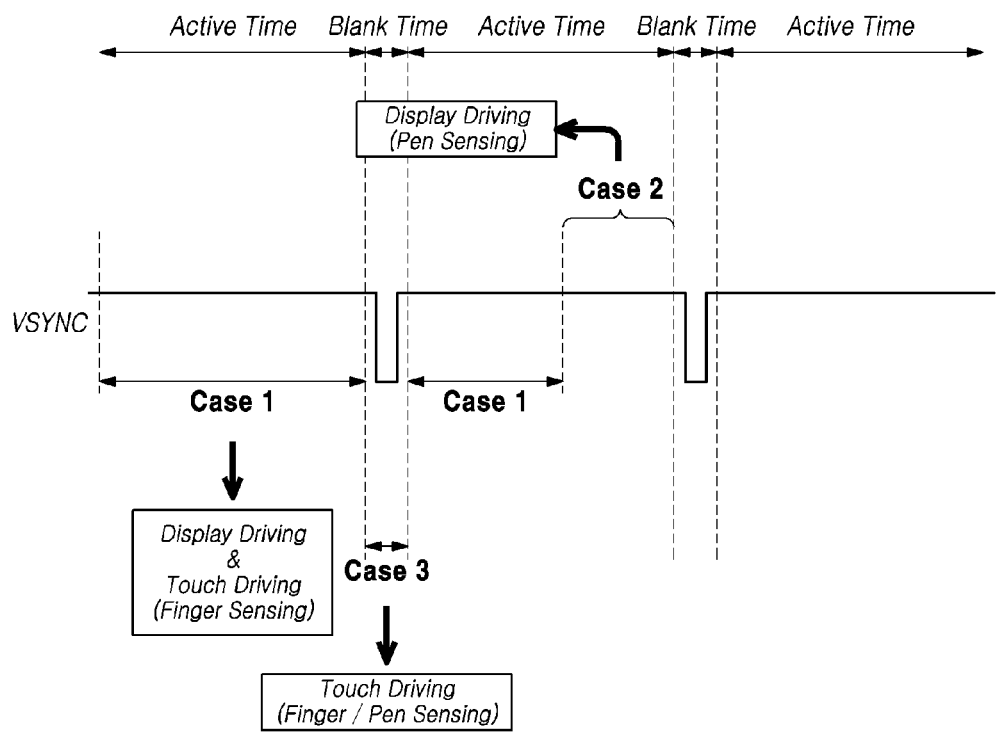
FIG. 8 is a view illustrating three cases of time free driving when a touch display device performs time free driving according to embodiments of the disclosure.
Figure 9:
FIG. 9 is a view illustrating a touch electrode driving signal TDS for each of three cases of time free driving of a touch display device according to embodiments of the disclosure.
Figure 9:
Figure 9:

FIG. 8 is a view illustrating three cases (e.g., cases 1, 2, and 3) of time free driving when a touch display device performs time free driving according to embodiments of the disclosure. FIG. 9 is a view illustrating a touch electrode driving signal TDS for each of three cases (e.g., cases 1, 2, and 3) of time free driving of a touch display device according to embodiments of the disclosure.

According to case 1 of time free driving, the touch display device may simultaneously perform display driving and touch driving. In this case, while a data signal Vdata for image display is supplied to a plurality of data lines DL by the data driving circuit DDC to perform display driving, the touch driving circuit TDC may sense at least one of the plurality of touch electrodes TE.

In case 1, the touch display device may supply the touch electrode driving signal TDS with a variable voltage to the touch electrode TE to perform touch driving.

Hereinafter, in case 1, the touch electrode driving signal TDS applied to the touch electrode TE is referred to as a first touch electrode driving signal TDS1. The first touch electrode driving signal TDS1 has a first amplitude AMP1.

In case 1, the touch display device may perform touch sensing, sensing a touch by a finger contact on the touch panel TSP. Such touch sensing is referred to as finger sensing.

Alternatively, in case 1, the touch display device may perform touch driving to sense the touch by the finger or pen when the finger or pen approaches the touch panel TSP rather than contacting the touch panel TSP. Such touch sensing is referred to as hover sensing.

According to case 2 of time-free driving, the touch display device may perform only display driving.

In case 2, the touch display device does not perform typical touch driving because it is not necessary to sense a touch by a finger. In other words, the touch display device does not supply the touch electrode driving signal TDS with a variable voltage to the plurality of touch electrodes TE disposed on the touch panel TSP.

In case 2, the touch display device may supply the touch electrode driving signal TDS in the form of a DC voltage. Hereinafter, in case 2, the touch electrode driving signal TDS applied to the touch electrode TE is referred to as a second touch electrode driving signal TDS2.

In case 2, the touch display device may receive a pen signal output from the pen through the touch electrode TE, sensing the pen. As a result of pen sensing, the touch display device may obtain the position of the pen, tilt, pressure (pen pressure), or various additional information.

According to case 3 of time-free driving, the touch display device may perform only touch driving.

In case 3, the touch display device may supply the touch electrode driving signal TDS with a variable voltage to the touch electrode TE to perform touch driving.

Hereinafter, in case 3, the touch electrode driving signal TDS applied to the touch electrode TE is referred to as a third touch electrode driving signal TDS3. The third touch electrode driving signal TDS3 has a third amplitude AMPS different from the first amplitude AMP1.

In case 3, the touch display device may perform touch sensing, sensing a touch by a finger contact on the touch panel TSP.

Referring to FIG. 8, in the touch display device, among the three cases (cases 1, 2, and 3) of time free driving, case 1 may proceed in an active time, and case 3 may proceed in a blank time. The active time may correspond to a time during which the screen of one frame is displayed, and the blank time may correspond to a time taken from the screen of one frame is displayed until the screen of the next frame starts to be displayed.

Referring to FIG. 8, during the active time, case 1 may be changed to case 2.

Referring to FIG. 8, during the active time, the touch display device may perform both display driving and touch driving for finger sensing (proceeding with case 1) and, for pen sensing, stop touch driving for finger sensing (i.e., changed from case 1 to case 2).

In cases 1 and 3, during touch driving for finger sensing, touch electrode driving signals TDS1 and TDS3 having amplitudes AMP1 and AMP3 may be applied to the touch electrode TE.

Referring to FIG. 9, the first amplitude AMP1 of the first touch electrode driving signal TDS1 applied to the touch electrode TE in case 1 where touch driving and display driving both are performed may be less than the third amplitude AMP3 of the third touch electrode driving signal TDS3 applied to the touch electrode TE in case 3 where touch driving but not display device is performed.

The first amplitude AMP1 of the first touch electrode driving signal TDS1 applied to the touch electrode TE during the active time may be less than the third amplitude AMP3 of the third touch electrode driving signal TDS3 applied to the touch electrode TE during the blank time.

Referring to FIG. 8, during the active time, the touch driving circuit TDC may supply the first touch electrode driving signal TDS1 having the first amplitude AMP1 or the second touch electrode driving signal TDS2 corresponding to a DC voltage to the plurality of touch electrodes TE.

Referring to FIG. 8, during the blank time, the touch driving circuit TDC may supply the third touch electrode driving signal TDS3 having the third amplitude AMP3 to one or more of the plurality of touch electrodes TE.

The driving corresponding to case 1 may proceed for one frame and may proceed only in some time duration within one frame. The driving corresponding to case 2 may be performed in all frames or some frames or proceed only in some time duration within the frame. Upon driving corresponding to case 3, driving for finger sensing may be performed or driving for pen sensing may be performed.

Figure 10:
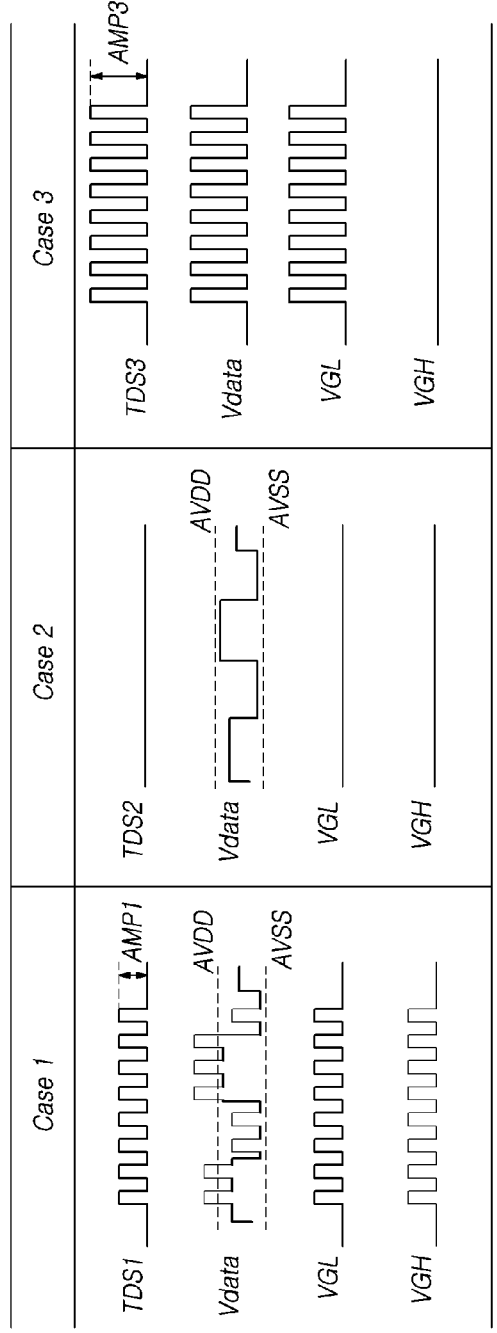
FIG. 10 is a view illustrating waveforms of main signals for each of three cases of time free driving in a touch display device according to embodiments of the disclosure.

FIG. 10 is a view illustrating the waveforms of main signals TDS1, TDS2, TDS3, Vdata, VGL_M, and VGH_M for three cases 1, 2, and 3 of time free driving in a touch display device according to embodiments of the disclosure.

Case 1 and case 2 are the driving cases during the active time. Case 3 is the driving case during the blank time.

For each of the three cases, the touch electrode driving signal TDS applied to the touch electrode TE, the data signal Vdata supplied to the data line DL, and the off-level gate voltage VGL and the on-level gate voltage VGH supplied to the gate driving circuit GDC to generate the scan signal Vgate supplied to the gate line GL are described.

In case 2 where display driving proceeds during the active time, the touch electrode driving signal TDS applied to the touch electrode TE is the second touch electrode driving signal TDS2 in the form of a DC voltage.

The data signal Vdata applied to the data line DL is a signal corresponding to an image analog signal digital-to-analog converted into by the image signal for display and may be a pixel voltage applied to the pixel electrode of the subpixel SP through the data line DL. However, the data signal Vdata may be a voltage varing between the driving voltage AVDD and the base voltage AVSS.

Each of the off-level gate voltage VGL and the on-level gate voltage VGH constituting the scan signal Vgate applied to the gate line GL is a corresponding DC voltage.

As described above, the touch electrode TE may also serve as a common electrode for display driving. Accordingly, in case 2 in which display driving is performed but not touch sensing during the active time, the second touch electrode driving signal TDS2 applied to the touch electrode TE corresponds to a common voltage for display.

Accordingly, an electric field may be formed between the pixel electrode and the touch electrode TE by the voltage difference between the data signal Vdata applied to the pixel electrode through the data line DL from the corresponding subpixel SP and the second touch electrode driving signal TDS2 corresponding to the common voltage applied to the touch electrode TE, so that desired light may be emitted from the corresponding subpixel SP.

In case 3 where touch driving proceeds during the blank time but not display driving, the touch electrode driving signal TDS applied to the touch electrode TE is the third touch electrode driving signal TDS3 having a third amplitude AMPS.

During the blank time, a data signal Vdata corresponding to a DC voltage may be applied to the data line DL, or the data line DL may be in a floating state. During the blank time, the scan signal Vgate of the off-level gate voltage VGL corresponding to a DC voltage may be applied to the gate line GL, or the gate line GL may be in an electrically floating state.

When the load free driving is performed during the blank time during which only touch driving is performed, the data line DL and the gate line GL may shake like the touch electrode TE from a viewpoint of voltage characteristics.

The data signal Vdata applied to the data line DL during the blank time according to load free driving may be the third touch electrode driving signal TDS3 or a load free driving signal identical or similar in signal characteristics (e.g., phase, frequency, and amplitude) to the third touch electrode driving signal TDS3.

The off-level gate voltage VGL applied to the data line GL during the blank time according to load free driving may be the third touch electrode driving signal TDS3 or a load free driving signal identical or similar in signal characteristics (e.g., phase, frequency, and amplitude) to the third touch electrode driving signal TDS3.

In case 1 in which display driving and touch driving are simultaneously performed during the active time, the touch electrode driving signal TDS applied to the touch electrode TE is the first touch electrode driving signal TDS1 having the first amplitude AMP1.

In case 1, since the display driving and the touch driving are simultaneously performed during the active time, the first touch electrode driving signal TDS1 is a touch electrode driving signal for touch sensing and a display common voltage Vcom for forming a capacitance with the data signal Vdata.

The first touch electrode driving signal TDS1 applied to the touch electrode TE is also the display common voltage Vcom for forming a capacitance with the data signal Vdata corresponding to the pixel voltage for display.

The first touch electrode driving signal TDS1 applied to the touch electrode TE has a predetermined voltage difference for display from the data signal Vdata corresponding to the pixel voltage for display.

In case 1 in which display driving and touch driving are simultaneously performed, the first touch electrode driving signal TDS1 performs two functions (as a driving signal for touch sensing and a common voltage for display).

As such, since the common voltage Vcom corresponding to the first touch electrode driving signal TDS1 is not constant but variable, the data signal Vdata applied to the data line DL requires as high an additional voltage variation as the first amplitude AMP1 of the first touch electrode driving signal TDS1, in addition to the original voltage variation for display, to prevent or at least reduce the data line DL from being influenced by touch driving.

In this case, the voltage difference between the data signal Vdata corresponding to the pixel voltage and the first touch electrode driving signal TDS1 has only the original voltage variation for display, with the voltage variation (i.e., the first amplitude AMP1) of the first touch electrode driving signal TDS1 excluded. Accordingly, normal display is possible.

Accordingly, the data signal Vdata in case 1 where display driving and touch driving simultaneously proceed may be a signal which is a combination of the data signal Vdata in case 2 where display driving alone proceeds and the first touch electrode driving signal TDS1.

In other words, the data signal Vdata in case 1 where display driving and touch driving simultaneously proceed may be a signal of the data signal Vdata in case 2 where display driving alone proceeds, offset by the first touch electrode driving signal TDS1. However, the data signal Vdata may be a voltage variation between the driving voltage AVDD and the base voltage AVSS.

Accordingly, the voltage difference between the data signal Vdata in case 1 where touch driving and display driving simultaneously proceed and the first touch electrode driving signal TDS1 is identical to the voltage difference between the data signal Vdata in case 2 where display driving alone proceeds and the second touch electrode driving signal TDS2.

In case 1, since touch driving and display driving are simultaneously performed, load free driving may be required.

In other words, in case 1, since touch driving and display driving are simultaneously performed, it is possible to prevent or at least reduce a parasitic capacitance from being formed between the touch electrode TE and the data line DL by touch driving and to prevent or at least reduce a parasitic capacitance from being formed between the touch electrode TE and the gate line GL by touch driving.

As described above, in case 1, the voltage of the touch electrode TE and the data line DL varies (swings) according to the voltage variation of the first touch electrode driving signal TDS1, so that only a voltage difference for display occurs between the touch electrode TE and the data line DL, and parasitic capacitance unnecessary for touch driving is not formed. In other words, in case 1, load free driving for the data line DL proceeds.

In case 1, for the gate driving circuit GDC to generate a scan signal Vgate applied to the gate line GL, the off-level gate voltage VGL and on-level gate voltage VGH supplied to the gate driving circuit GDC each may be a load free driving signal having the same or similar signal characteristics (e.g., phase, frequency, and amplitude) to those of the first touch electrode driving signal TDS1.

In case 1, the data signal Vdata may be a signal modulated based on the first touch electrode driving signal TDS1. The scan signal Vgate may be a signal modulated based on the first touch electrode driving signal TDS1.

The time free driving of a touch display device according to embodiments of the disclosure described above is described below in detail.

Figure 11:
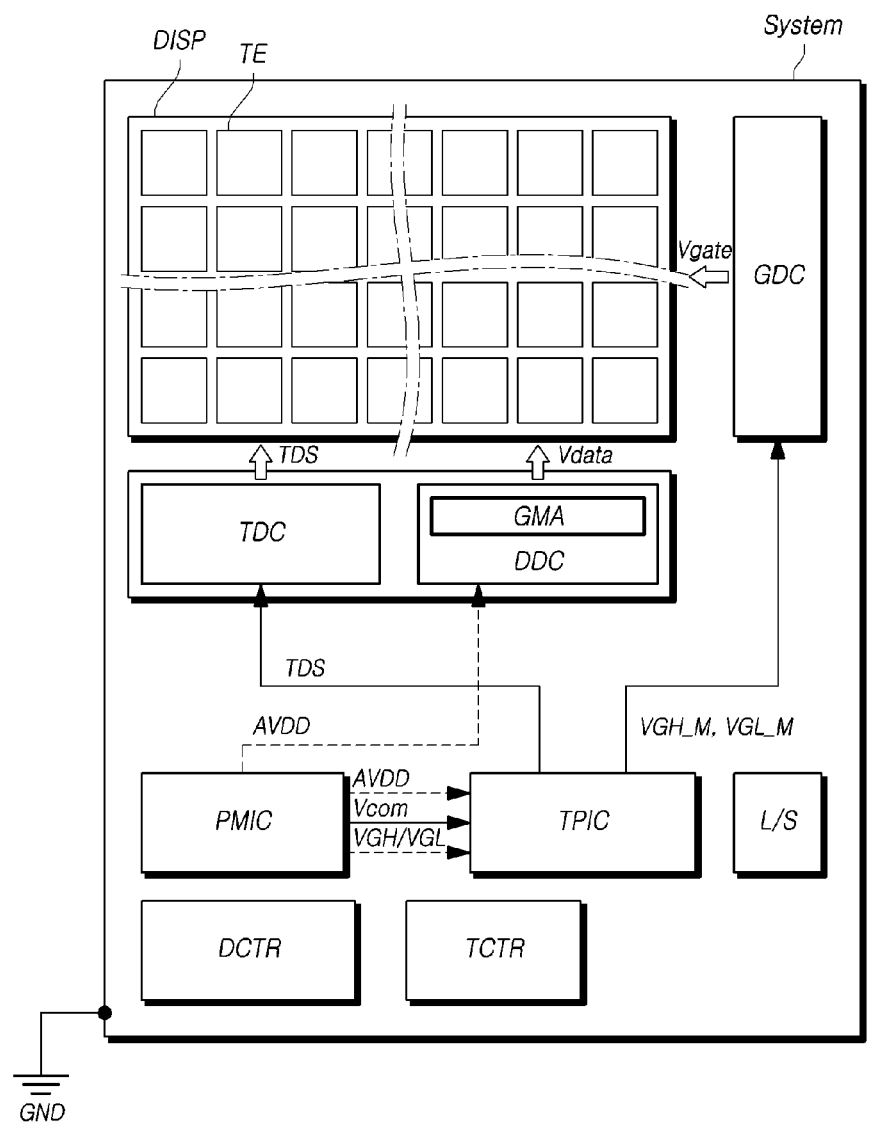
FIG. 11 is a view illustrating a time free driving system of a touch display device according to embodiments of the disclosure.

FIG. 11 is a view illustrating a time free driving system of a touch display device according to embodiments of the disclosure.

Referring to FIG. 11, a touch display device according to embodiments of the disclosure may include a display panel DISP having a plurality of data lines DL and a plurality of gate lines GL and a plurality of touch electrodes TE, a gate driving circuit GDC electrically connected with the plurality of gate lines GL and configured to drive the plurality of gate lines GL, a data driving circuit DDC electrically connected with the plurality of data lines DL and configured to drive the plurality of data lines DL, and a touch driving circuit TDC electrically connected with the plurality of touch electrodes TE and configured to drive the plurality of touch electrodes TE.

Further, the touch display device according to embodiments of the disclosure may further include a display controller DCTR controlling a driving operation of the data driving circuit DDC and the gate driving circuit GDC and a touch controller TCTR controlling a driving operation of the touch driving circuit TDC or calculating a presence or absence of a touch and/or the coordinates of a touch using sensing data output from the touch driving circuit TDC.

Further, the touch display device according to embodiments of the disclosure may further include a power control circuit for supplying power. The power control circuit may include a touch power circuit (e.g., touch power integrated circuit (TPIC)) and a power management circuit (e.g., power management integrated circuit (PMIC)).

The touch power circuit TPIC may supply the touch electrode driving signal TDS necessary for driving the touch electrode TE to the touch driving circuit TDC.

The touch driving circuit TDC may supply a touch electrode driving signal TDS1 or TDS3 for touch sensing to a touch electrode TE to be sensed among the plurality of touch electrodes TE, based on the modulation signal (e.g., pulse width modulation signal) received from the touch controller TCTR. The touch power circuit TPIC may supply the modulation signal (e.g., pulse width modulation signal) received from the touch controller TCTR, as the load free driving signal, to the touch electrode TE not to be sensed among the plurality of touch electrodes TE. The touch electrode driving signal TDS1 or TDS3 applied to the touch electrode TE to be sensed and the load free driving signal (which may be regarded as a touch electrode driving signal TDS) applied to the touch electrode TE not to be sensed may be identical signals.

The power management circuit PMIC may supply various voltages (AVDD, Vcom, VGH, or VGL) necessary to supply a signal to the touch power circuit TPIC to the touch power circuit TPIC.

The power management circuit PMIC may supply various DC voltages (e.g., AVDD and AVSS) necessary for data driving of the data driving circuit DDC to the data driving circuit DDC.

The touch controller TCTR may supply a pulse width modulation (PWM) signal to output or generate various signals (e.g., TDS) in circuits, such as the touch power circuit TPIC, touch driving circuit TDC, or data driving circuit DDC. The touch controller TCTR may be implemented as, for example, a micro control unit (MCU), a processor, or the like.

The touch power circuit TPIC may modulate and output the common voltage Vcom input from the power management circuit PMIC based on the pulse width modulation (PWM) signal input from the touch controller TCTR. Accordingly, the touch power circuit TPIC may generate and output a common voltage pulse whose pulse width has been modulated according to a voltage pulse corresponding to the pulse width modulation (PWM) signal.

The touch display device according to embodiments of the disclosure may further include one or more level shifters L/S for changing voltage levels of various signals.

The one or more level shifters L/S may be implemented separately from the data driving circuit DDC, gate driving circuit GDC, touch driving circuit TDC, touch power circuit TPIC, power management circuit PMIC, display controller DCTR, and touch controller TCTR or may be included as one or more internal modules of one or more of the data driving circuit DDC, gate driving circuit GDC, touch driving circuit TDC, touch power circuit TPIC, power management circuit PMIC, display controller DCTR, and touch controller TCTR.

Referring to FIG. 11, the data driving circuit DDC may include a gamma block GMA necessary to convert the image digital signal input from the display controller DCTR into an image analog signal.

Referring to FIG. 11, in the touch display device according to embodiments of the disclosure, the display panel DISP, the data driving circuit DDC, the gate driving circuit GDC, and the touch driving circuit TDC may be grounded to the DC ground voltage GND.

Figure 12:
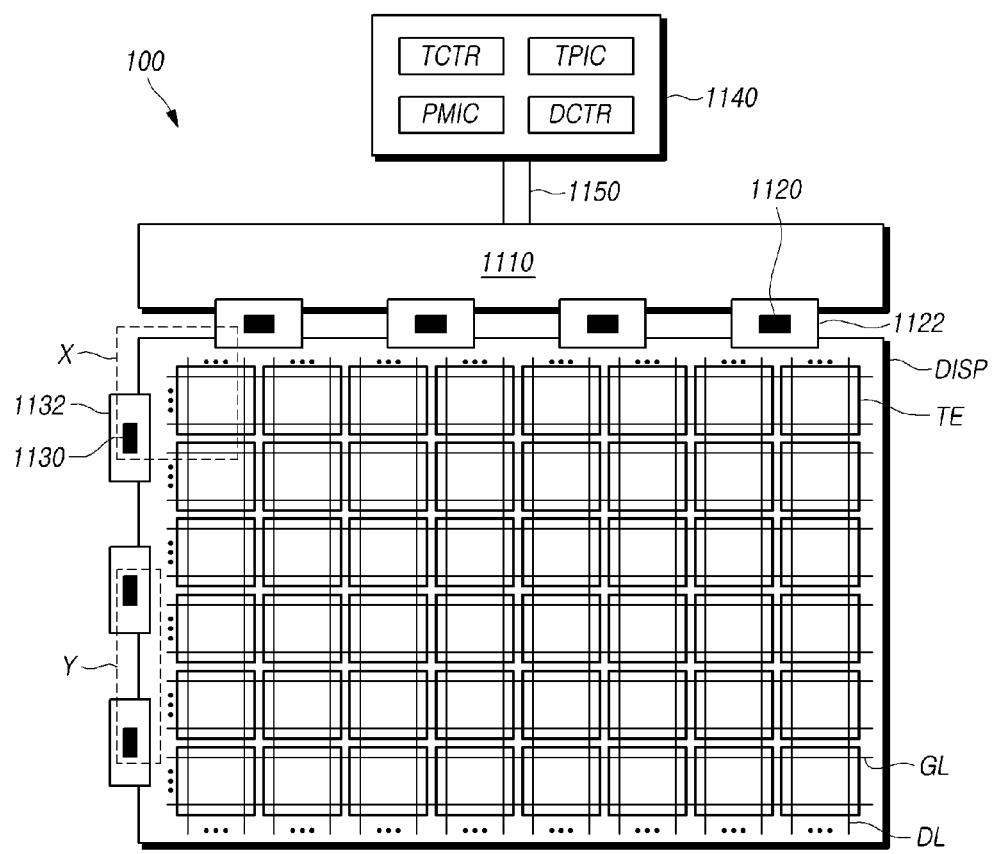
FIG. 12 is a view schematically illustrating a touch display device according to embodiments of the disclosure.

FIG. 12 is a view schematically illustrating a touch display device 100 according to embodiments of the disclosure.

Referring to FIG. 12, the touch display device 100 according to embodiments of the disclosure includes a display panel DISP and a first driving circuit 1120 electrically connected with the display panel DISP.

The first driving circuit 1120 may be a circuit including the above-described data driving circuit DDC and touch driving circuit TDC. The first driving circuit 1120 may perform the function of the above-described source driver integrated circuit SDIC. The first driving circuit 1120 is also referred to as a source driver readout integrated circuit (SRIC). The touch display device 100 may include one or more first driving circuits 1120.

The first driving circuit 1120 may be mounted on a substrate or a circuit film to be electrically connected to the display panel DISP. For example, the first driving circuit 1120 may be mounted on the circuit film 1122, and one side of the circuit film 1122 may be connected to a bonding pad (not shown) of the display panel DISP. Accordingly, the first driving circuit 1120 and the display panel DISP may be electrically connected.

Referring to FIG. 12, the first driving circuit 1120 may supply a data signal Vdata to a plurality of data lines DL positioned on the display panel DISP. The first driving circuit 1120 may apply the common voltage Vcom to the plurality of touch electrodes TE positioned on the display panel DISP. During the touch sensing period, the first driving circuit 1120 may supply the touch electrode driving signal TDS to one or more of the plurality of touch electrodes TE positioned on the display panel DISP.

Referring to FIG. 12, the touch display device 100 according to embodiments of the disclosure includes a second driving circuit 1130 electrically connected with the display panel DISP.

The second driving circuit 1130 may be a circuit including the above-described gate driving circuit GDC.

The second driving circuit 1130 may be mounted on a circuit film or mounted on a substrate. Referring to FIG. 12, the second driving circuit 1130 may be mounted on the circuit film 1132, for example. The second driving circuit 1130 may be electrically connected to the bonding pad of the display panel DISP in a chip-on film (COF) fashion.

Referring to FIG. 12, the touch display device 100 according to embodiments of the disclosure may include at least one source printed circuit board (SPCB) 1110 required for circuit connection to the first driving circuit 1120. The touch display device 100 according to embodiments of the disclosure may include a control printed circuit board (CPCB) 1140 configured to mount control components and various electronic devices.

In some cases, the first driving circuit 1120 may be mounted on at least one source printed circuit board 1110.

At least one source printed circuit board 1110 and the control printed circuit board 1140 may be electrically connected through at least one connection member 1150.

A touch controller TCTR, a power management circuit PMIC, a display controller DCTR, and a touch power circuit TPIC (e.g., signal generating circuits) may be mounted on the control printed circuit board 1140.

The at least one connection member 1150 may be a flexible printed circuit board (FPCB) or a flexible flat cable (FFC).

At least one source printed circuit board 1110 and control printed circuit board 1140 may be integrated into a single printed circuit board.

The display controller DCTR outputs a gate driving circuit control signal GCS, and the gate driving circuit control signal GCS is input to the second driving circuit 1130 through the bonding pad of the display panel DISP.

Referring to FIG. 12, the second driving circuit 1130 may receive the gate driving circuit control signal GCS input through a line disposed in the corner area (e.g., area X in FIG. 12) of the display panel DISP. The second driving circuit 1130 may receive the gate driving circuit control signal GCS through a line positioned in the area (e.g., area Y in FIG. 12) between two different second driving circuits 1130.

However, the gate driving circuit control signal GCS is a signal output from the display controller DCTR and may differ from the signals output via the touch power circuit TPIC.

In other words, the touch power circuit TPIC may receive the pulse width modulation (PWM) signal and output signals for load free driving LFD and/or the touch electrode driving signal TDS. The signals output from the display controller DCTR are signals that are not modulated according to the pulse width modulation (PWM) signal.

Accordingly, the accuracy of touch sensing may be reduced in the area where the line to which the signal output from the display controller DCTR is input is positioned.

Referring to FIG. 12, the area where the accuracy of touch sensing is reduced may include an area adjacent to the line to which the gate driving circuit control signal GCS is input. Such an area may include an area adjacent to the corner (e.g., area X) of the display panel DISP and an area adjacent to the area (e.g., area Y) between the bonding pads in the display panel DISP.

Accordingly, a need exists for a scheme for increasing the accuracy of touch sensing in the corresponding areas.

Figure 13:
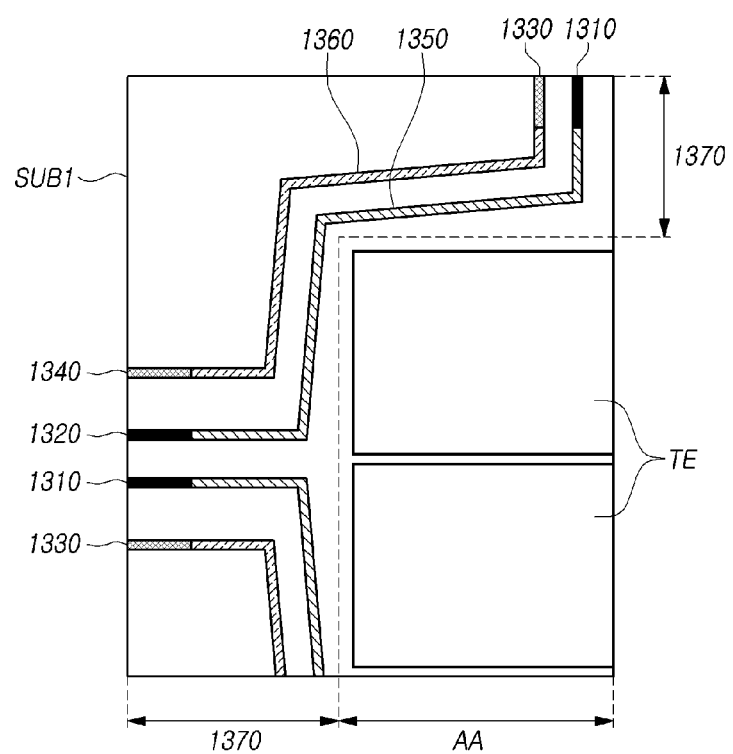
FIG. 13 is an enlarged view illustrating area X of FIG. 12 in a touch display device according to embodiments of the disclosure.

FIG. 13 is an enlarged view illustrating area X of FIG. 12 in a touch display device 100 according to embodiments of the disclosure.

Referring to FIG. 13, a touch display device 100 according to embodiments of the disclosure may include a first line 1360 to which the gate driving circuit control signal GCS is applied and a second line 1350 to which the pulse width modulation (PWM) signal output from the touch power circuit TPIC is applied. The pulse width modulation (PWM) signal may be a common voltage pulse which has been pulse width modulated or a display voltage pulse which has been pulse width modulated.

The first line 1360 may be electrically connected to a first pin 1330 and a second pin 1340. The gate driving circuit control signal GCS input to the first pin 1330 is output to the second pin 1340 through the first line 1360.

Referring to FIG. 13, the pulse width modulated signal may be transferred through the second line 1350 or may be transferred through a jumping pattern (not shown) formed on the first substrate SUB1. The jumping pattern may include one or more contact holes. The jumping pattern may be positioned in a line on glass (LOG) area 1370 on the first substrate SUB1.

The first pin 1330 and the second pin 1340 may be positioned on a bonding pad of the display panel DIPS. In some cases, the gate driving circuit may be disposed on the first substrate SUB1 in a gate-in-panel type, and the signal input to the first pin 1330 may be transferred to the gate driving circuit through the first line 1360. In this case, the second pin 1340 may be omitted.

Signals may be transferred between two different gate driving circuits by the above-described jumping pattern. For example, when the pulse width modulated signal is output from any one gate driving circuit disposed in a gate-in-panel (GIP) type and transferred to another gate driving circuit disposed in the gate-in-panel (GIP) type, it may be transferred through the jumping pattern.

Referring to FIGS. 12 and 13 together, the signal output from the display controller DCTR may be input to the first pin 1330. Alternatively, the signal output from the display controller DCTR may be input to the second pin 1340 and then be output to the first pin 1330 through the second driving circuit 1130.

The signal applied to the first line 1360 may be any one of gate driving circuit control signals GCS, such as a gate start pulse GSP, a gate shift clock GSC, and a gate output enable signal GOE.

The second line 1350 is electrically connected to the third pin 1310 and the fourth pin 1320. The signal input to the third pin 1310 may be output to the fourth pin 1320 through the second line 1350.

The pulse width modulated signal, output from the touch power circuit TPIC, may be input to the second line 1350 during the touch sensing period for touch sensing.

The touch power circuit TPIC may output a pulse width modulated common voltage according to the voltage pulse corresponding to the pulse width modulation (PWM) signal, and the pulse width modulated common voltage pulse may be applied to the second line 1350.

The pulse width modulated common voltage pulse is output from the fourth pin 1320. The signal output to the fourth pin 1320 may be input to the above-described second driving circuit 1130. The second driving circuit 1130 may output the pulse width modulated common voltage pulse to the third pin 1310.

The touch power circuit TPIC may output pulse width modulated display voltage pulses according to the voltage pulse corresponding to the pulse width modulation (PWM) signal. The display voltage may include, for example, an off-level gate voltage VGL or may include an on-level gate voltage VGH.

Accordingly, the signal input to the second line 1350 may be a pulse width modulated common voltage or pulse width modulated display voltage pulses.

The pulse width modulated common voltage may be a signal having the same or similar in signal characteristics (e.g., phase, frequency, and amplitude) to the touch electrode driving signal TDS input to at least one touch electrode TE among the plurality of touch electrodes TE during the touch sensing period.

For convenience of description, it is assumed below that the signal input to the second line 1350 is a pulse width modulated common voltage, but the disclosure is not limited thereto.

Referring to FIG. 13, the first line 1360 and the second line 1350 may be disposed in a non-display area around the display area AA.

When the first substrate SUB1 is a glass substrate, the first line 1360 and the second line 1350 may be disposed in a line on glass (LOG) type. Accordingly, at least a portion of the non-display area may be the LOG area 1370. The first line 1360 and the second line 1350 may be disposed in the LOG area 1370. The first pin 1330, the second pin 1340, the third pin 1310, or the fourth pin 1320 may be disposed in the LOG area 1370.

Referring to FIG. 13, the first line 1360 and the second line 1350 may be disposed adjacent to each other. The second line 1350 may be positioned closer to the display area AA than the first line 1360.

Figure 14:
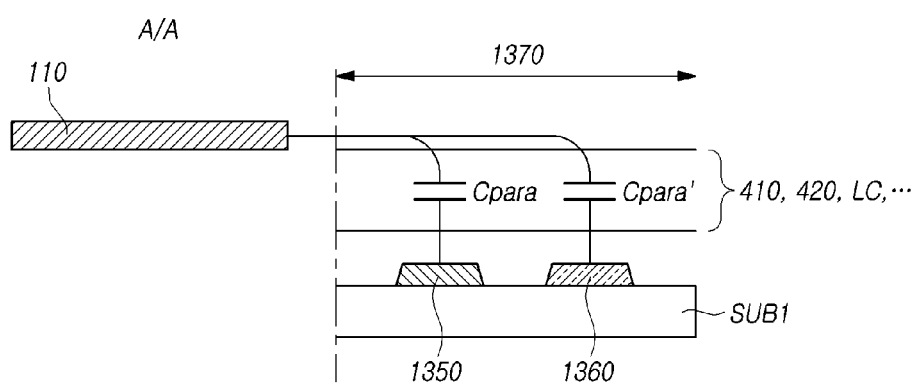
FIG. 14 is a view conceptually illustrating a parasitic capacitance formed at a touch electrode to which a touch electrode driving signal is applied in a touch display device according to embodiments of the disclosure.

FIG. 14 is a view conceptually illustrating a parasitic capacitance formed at a touch electrode TE to which a touch electrode driving signal TDS is applied in a touch display device 100 according to embodiments of the disclosure.

Referring to FIG. 14, in the touch electrode TE to which the touch electrode driving signal TDS is applied, a parasitic capacitance Cpara may be formed between the second lines 1350 positioned around the touch electrode TE. A parasitic capacitance Cpara' may be formed between the touch electrode TE to which the touch electrode driving signal TDS is applied and the first line 1360 positioned around the touch electrode TE.

Since a pulse width modulated common voltage may be applied to the second line 1350, a parasitic capacitance Cpara between the second line 1350 and the touch electrode TE to which the touch electrode driving signal TDS is applied is significantly small.

However, since the gate driving circuit control signal GCS is applied to the first line 1360, and such signals are signals output from the display controller DCTR, they are not pulse width modulated signals. Accordingly, influence due to the parasitic capacitance Cpara' may exist between the touch electrode TE to which the touch electrode driving signal TDS is applied and the first line 1360, and the parasitic capacitance Cpara' may affect touch sensing accuracy.

A factor affecting the parasitic capacitance Cpara' between the touch electrode TE and the first line 1360 may be the insulators included in the touch display device 100. Such insulators may include, for example, a light blocking layer 410, a high-resistance oxide layer 420, and a liquid crystal LC. When the array substrate and the color filter substrate are bonded to each other through a sealing member, the sealing member may also be a factor affecting the parasitic capacitance Cpara'.

Accordingly, in the touch display device according to embodiments of the disclosure, the second line 1350 may be disposed as broad (e.g., wide) as possible, and the above-described insulating material between the first line 1360 and the touch electrode TE is positioned as small as possible, so that touch sensing accuracy may increase even in the outermost periphery of the display area.

Figure 15:
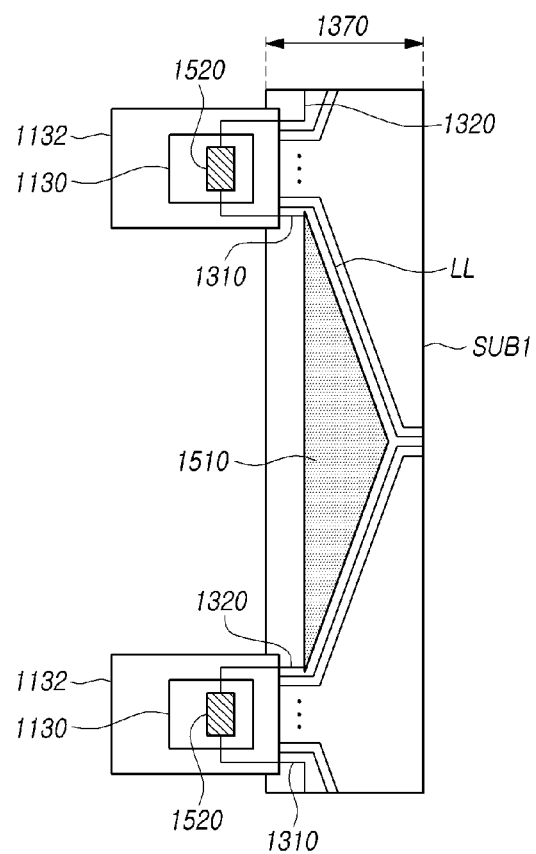
FIG. 15 is a view illustrating an example in which a wide line is positioned on a first substrate in a touch display device according to embodiments of the disclosure.

FIG. 15 is a view illustrating an example in which a wide line 1510 is positioned on a first substrate SUB1 in a touch display device according to embodiments of the disclosure.

Referring to FIG. 15, a wide line 1510 may be positioned on the first substrate SUB1. The wide line 1510 is included in the above-described second line 1350. In the same sense, the second line 1350 having a wide width may be a wide line 1510. The second line 1350 having a wide width may mean having a wider width than the first line 1360. In one embodiment, the wide line 1510 has a width that is wider than the second line 1350. The wide line 1510 may be considered a part of the second line 1350. Thus, the second line 1350 may be considered a first part and the wide line

1510 may be considered a second part of the second line 1350. The following description assumes that the second line 1350 having a wide width is the wide line 1510.

The wide line 1510 is electrically connected to each of the third pin 1310 and the fourth pin 1320. In view of the wide line 1510, the voltage input through the third pin 1310 is output through the fourth pin 1320.

The third pin 1310 and the fourth pin 1320 electrically connected to one wide line 1510 are electrically connected to different second driving circuits 1130, respectively.

Referring to FIG. 15, the third pin 1310 and the fourth pin 1320 may be electrically connected to each other through a bypass circuit 1520.

The bypass circuit 1520 may refer to one conductive wire positioned on the circuit film 1132. The bypass circuit 1520 may further include a level shifter for maintaining the amplitude of the common voltage pulse which has been voltage dropped while passing through the wide line 1510.

The bypass circuit 1520 may be a circuit configured separately from the second driving circuit 1130, but the bypass circuit 1520 and the second driving circuit 1130 may be configured as a single circuit. In some cases, the bypass circuit 1520 may be positioned inside the gate driving circuit GDC. In this case, the third fin 1310 and the fourth fin 1320 may be electrically connected to the gate driving circuit GDC.

Referring to FIG. 15, the touch display device according to embodiments of the disclosure may include a plurality of link lines LL configured to electrically connect the second driving circuit 1130 and the plurality of gate lines GL. The plurality of link lines LL may be positioned in the LOG area 1370.

The plurality of link lines LL may be disposed on the first substrate SUB1 in the shape of a delta Δ that spreads widely while extending in the opposite direction from the direction of the second driving circuit 1130.

The wide line 1510 may be disposed in an area that does not overlap the plurality of link lines LL. The wide line 1510 may have a tapered V-shape. The wide line 1510 may have an inclined surface. The inclined surface may extend in a direction parallel to the link line LL adjacent to the wide line 1510 among the plurality of link lines LL. Accordingly, it may be possible to dispose the widest line 1510 as broad as possible in the area where the plurality of link lines LL are not positioned.

In FIG. 15, the wide line 1510 is shown as having a triangular shape, but the shape of the wide line 1510 may have various shapes within a range in which it may fill the area where the plurality of link lines LL are not positioned. For example, the wide line 1510 may have a rectangular or pentagonal shape.

The wide line 1510 may have vertices which have been trimmed to be not sharp but blunt. In this case, the increase in charge density at the vertices may be reduced. Accordingly, the increase in electric field at the vertices may be decreased. When the wide line 1510 has a polygonal shape which has four or more vertices, the increase in charge density at the vertices may be further alleviated.

Although the wide line 1510 is described below as having a triangular shape as an example, the wide line 1510 is not limited thereto.

Figure 16:
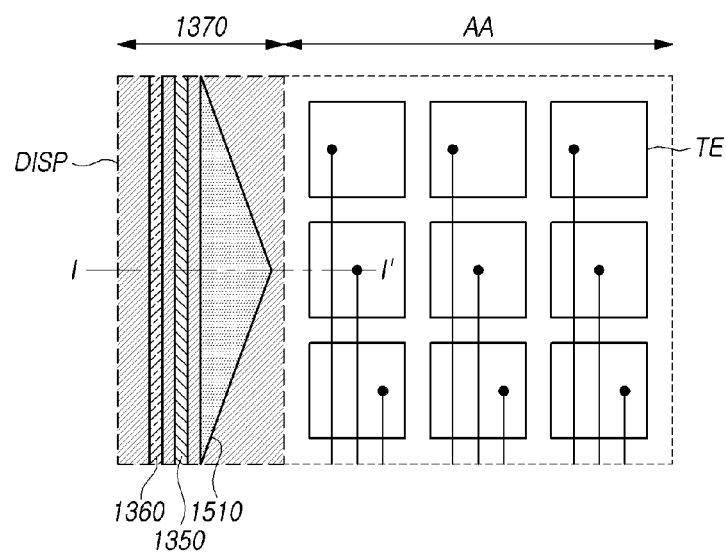
FIG. 16 is a view illustrating an example in which a first line and a second line are positioned in a non-display area in a touch display device according to embodiments of the disclosure.

FIG. 16 is a view illustrating an example in which a first line 1360 and a second line 1350 are positioned in a non-display area in a touch display device according to embodiments of the disclosure.

The second line 1350 means a line to which the signal pulse width modulated according to the pulse width modulation (PWM) signal is input, although it is not the wide line 1510. For example, if the pulse width modulated common voltage is applied to the wide line 1510 during the touch sensing period, a pulse width modulated display voltage (e.g., VGL or VGH) may be applied to the second line 1350. Alternatively, if any one of the pulse width modulated display voltage (e.g., VGL or VGH) pulses is applied to the wide line 1510 during the touch sensing period, a pulse width modulated common voltage may be applied to the second line 1350. In the disclosure, the display voltage which has been pulse width modulated and the display voltage which has not been pulse width modulated are collectively referred to as a "display signal."

For convenience of description, it is assumed below that a pulse width modulated common voltage is applied to the wide line 1510 during the sensing period. It is also assumed below that any one of pulse width modulated display voltages (e.g., VGL or VGH) is applied to the second line 1350 during the sensing period. However, the touch display device according to embodiments of the disclosure is not limited thereto.

The width of the widest portion of the wide line 1510 may be larger than the widths of the first line 1360 and the second line 1350. Accordingly, the first line 1360 and the second line 1350 may be referred to as narrow lines as compared to the wide line 1510.

Referring to FIG. 16, the wide line 1510 may be positioned adjacent to the second line 1350. The wide line 1510 may be positioned adjacent to the first line 1360 in other embodiments.

The wide line 1510 may be positioned closer to the touch electrode TE than the first line 1360 and the second line 1350. Thus, the wide line 1510 is between the touch electrode TE and the first and second lines 1360, 1350.

The first line 1360 and the second line 1350 may extend parallel to each other. The first line 1360 and the wide line 1510 may extend parallel to each other. In other words, the first line 1360, the second line 1350, and the wide line 1510 may be lines that electrically connect two different second driving circuits. These lines may extend from any one second driving circuit to the other adjacent second driving circuit.

Referring to FIG. 16, the first line 1360, the second line 1350, and the wide line 1510 may be positioned in the LOG area 1370 around the display area AA.

Accordingly, in the periphery area of the touch display device, in particular, in the area in which the plurality of touch electrodes TE adjacent to the second driving circuit are positioned, the accuracy of touch sensing may greatly increase.

FIGS. 17, 18, 19, 20, and 21 are cross-sectional views taken along I-I' of FIG. 16 in a touch display device according to embodiments of the disclosure.

Figure 17:
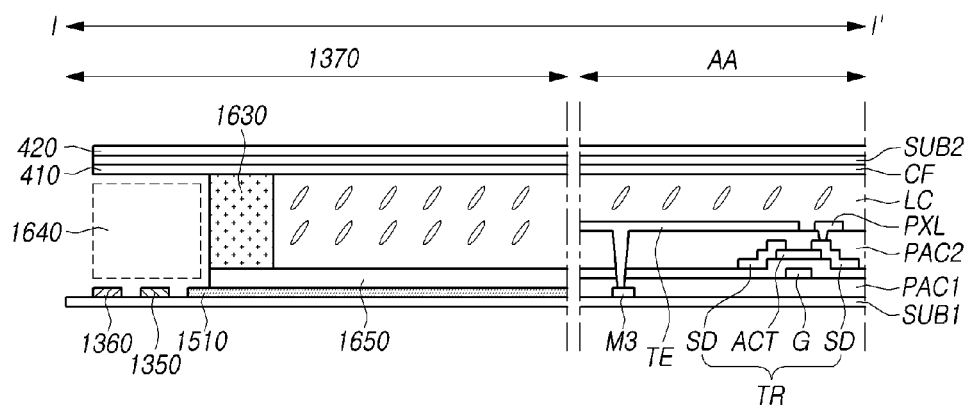
FIGS. 17, 18, 19, 20, and 21 are views taken along I-I' of FIG. 16 in a touch display device according to embodiments of the disclosure.

The description is made with reference to FIG. 17.

A touch display device according to embodiments of the disclosure may have a display area AA in which a plurality of subpixels are positioned and an LOG area 1370 around the display area AA.

The display area AA is described. A metal layer M3 is positioned on the first substrate SUB1 to supply a common voltage Vcom or touch electrode driving signal TDS to at least one touch electrode TE among the plurality of touch electrodes TE. The metal layer M3 may be covered by a first planarization layer PAC1.

A thin film transistor TR may be positioned on the first planarization layer PAC1. The thin film transistor TR may be disposed in each of a plurality of subpixels.

The thin film transistor TR may include a gate electrode G electrically connected to any one of the plurality of gate lines GL and an active layer ACT where the gate electrode G and the channel area are positioned to overlap each other.

The thin film transistor TR may include a source/drain electrode SD electrically connected to the active layer ACT. The source/drain electrode SD supplies the data signal input to any one data line DL among the plurality of data lines DL to the pixel electrode PXL.

The pixel electrode PXL may be positioned on the second planarization layer PAC2 covering the source/drain electrode SD.

Referring to FIG. 17, the touch electrode TE and the pixel electrode PXL may be positioned on the same layer on the second planarization layer PAC2. The rotation angle of the molecules in the liquid crystal LC may be adjusted according to the magnitude of the electric field formed between the touch electrode TE and the pixel electrode PXL. The amount of light of the subpixel may be adjusted according to the rotation angle of the molecules in the liquid crystal.

The liquid crystal LC may be positioned between the first substrate SUB1 and the second substrate SUB2. Specifically, the first substrate SUB1 and the second substrate SUB2 may be bonded to each other by a sealing member 1630. The liquid crystal LC may be injected into the space formed by bonding by the sealing member 1630.

When the display device according to embodiments of the disclosure is an organic light emitting display device including organic light emitting elements, the display device may omit the liquid crystal, and the amount of light of the subpixel may be adjusted according to the amount of current flowing through the organic light emitting element.

Although an example in which the display device according to embodiments of the disclosure is a liquid crystal display is described below, the disclosure is not limited thereto.

A second substrate SUB2 is positioned opposite the first substrate SUB1. A color filter layer CF including a color filter and a light blocking layer 410 for separating a plurality of subpixels may be positioned on one surface of the second substrate SUB2.

Referring to FIG. 17, a high-resistance oxide layer 420 may be positioned on the other surface of the second substrate SUB2.

The high-resistance oxide layer 420 may be disposed to extend from the other surface of the second substrate SUB2 to the LOG area 1370.

The light blocking layer 410 may be positioned in the LOG area 1370 to prevent or at least reduce light from leaking through the edge of the display area AA.

To further suppress light leakage, an anti-light leak layer 1650 may be further disposed on the first substrate SUB1.

The anti-light leak layer 1650 is positioned to overlap the light blocking layer 410 in the LOG area 1370. The anti-light leak layer 1650 may be applied to an area overlapping the light blocking layer 410 on the first substrate SUB1. The anti-light leak layer 1650 may include a black pigment or include a color pigment other than the black pigment.

A sealing member 1630 may be positioned in the LOG area 1370. The sealing member 1630 may be positioned to overlap the light blocking layer 410 and the anti-light leak layer 1650.

Referring to FIG. 17, the first line 1360 is positioned outside the sealing member 1630.

In the touch display device according to embodiments of the disclosure, a low-permittivity material may be disposed in the area 1640 on the first line 1360 to alleviate the decrease in touch sensing accuracy due to a parasitic capacitance formed between the touch electrode TE to which the touch electrode driving signal TDS is applied and the first line 1360 to which the gate driving circuit control signal GCS is applied.

Alternatively, the area 1640 on the first line 1360 may be an empty space. In this case, the area 1640 between the first line 1360 and the second substrate SUB2 may be filled with air.

The low-permittivity material may mean a material having a lower permittivity than that of at least one of the liquid crystal LC, the light blocking layer 410 and the sealing member 1630. In one embodiment, the material having a low permittivity may mean a material having a lower permittivity than any one of the liquid crystal LC, the light blocking layer 410 and the sealing member 1630.

For example, in a typical use environment of the touch display device, the permittivity of the liquid crystal LC may be about 8.7 (F/m), the permittivity of the light blocking layer 410 may be about 4 (F/m), and the permittivity of the sealing member 1630 may be about 2.8 (F/m).

The permittivity of air may be about 1.00059. Accordingly, air may correspond to a low-permittivity material.

Referring to FIG. 17, air, but not the sealing member 1630 and the liquid crystal LC, may be positioned in the area 1640 between the first line 1360 and the second substrate SUB2. Accordingly, the parasitic capacitance value formed between the touch electrode TE and the first line 1360 may be reduced.

The wide line 1510 to which the pulse width modulated common voltage is applied may be positioned to overlap the sealing member 1630, the liquid crystal LC, and the light blocking layer 410. Accordingly, even when materials having a relatively high permittivity are positioned on the wide line 1510, the accuracy of touch sensing is not decreased.

Accordingly, the touch display device according to embodiments of the disclosure may enhance touch sensing accuracy in the display area AA adjacent to the LOG area 1370.

Figure 18:
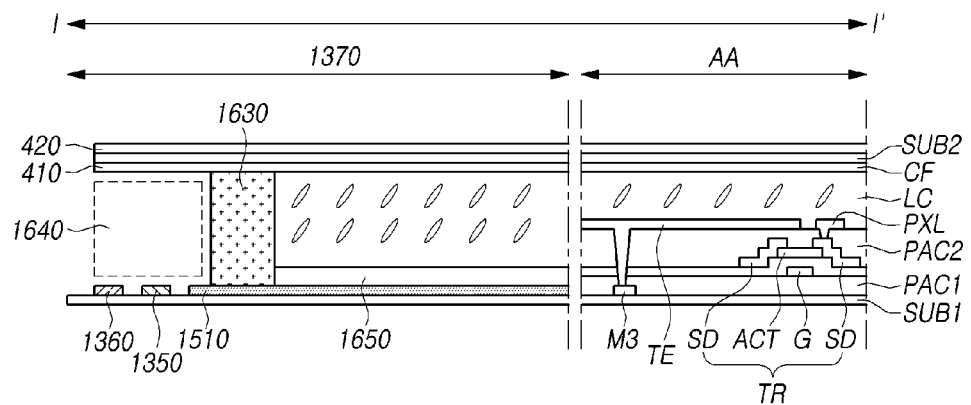

Referring to FIG. 18, in the touch display device according to embodiments of the disclosure, the sealing member 1630 may contact the wide line 1510 in the LOG area 1370. Accordingly, the anti-light leak layer 1650 may be positioned inside the sealing member 1630 without overlapping the sealing member 1630.

Figure 19:
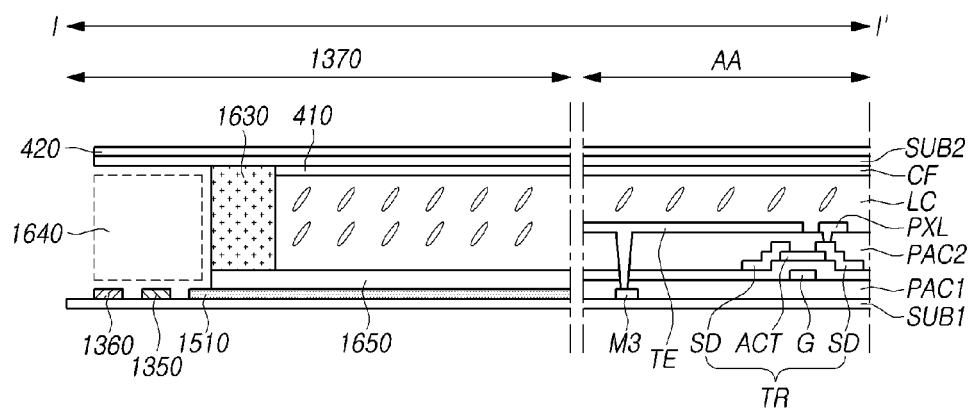

Referring to FIG. 19, in the touch display device according to embodiments of the disclosure, one end of the light blocking layer 410 may be positioned to overlap the sealing member 1630 or be positioned inside the sealing member 1630. In other words, at least a portion of the sealing member 1630 may be positioned without overlapping the light blocking layer 410.

For example, at least a portion of the sealing member 1630 may contact the second substrate SUB2. One end of the light blocking layer 410 may be positioned between the sealing member 1630 and the second substrate SUB2 or positioned inside the sealing member 1630.

In the embodiment disclosed in FIG. 19, as compared with the embodiment disclosed in FIG. 18, the light blocking layer 410, which is a material having a relatively high permittivity, may be removed from the area 1640 on the first line 1360. Accordingly, an advantage may be obtained in terms of accuracy of touch sensing.

Figure 20:
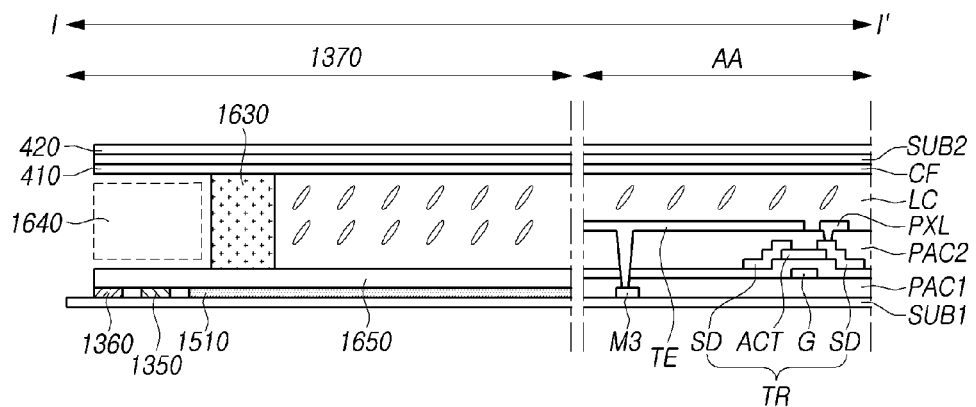

Referring to FIG. 20, in the touch display device according to embodiments of the disclosure, the anti-light leak layer 1650 may be positioned to overlap the first line 1360 and/or the second line 1350 in the LOG area 1370. The anti-light leak layer 1650 may be interposed between the first line 1360 and the second substrate SUB2. In the embodiment of FIG. 20, as compared with the embodiment of FIG. 18, an anti-light leak layer 1650 may further be disposed on the first line 1360 and/or the second line 1350. Accordingly, damage to the first line 1360 and/or the second line 1350 may be prevented or at least reduced by the anti-light leak layer 1650.

Figure 21:
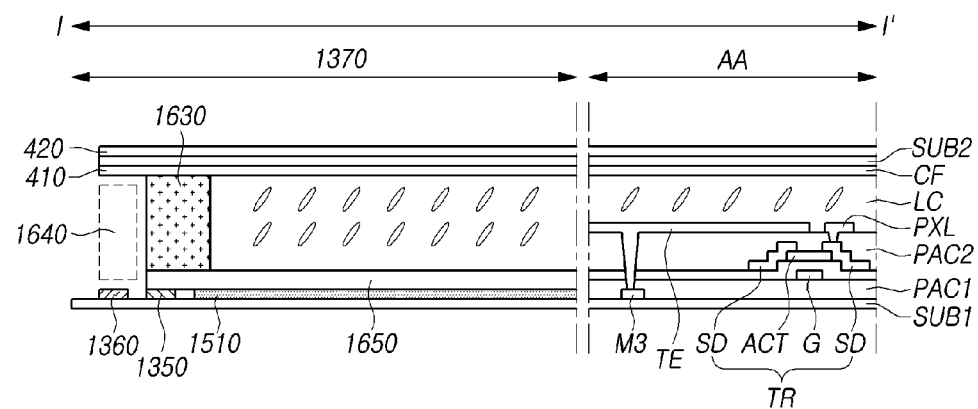

Referring to FIG. 21, in the touch display device according to embodiments of the disclosure, the anti-light leak layer 1650 may be positioned to overlap the second line 1350 and/or the first line 1360 in the LOG area 1370. The sealing member 1630 may be positioned to overlap the second line 1350. For example, the anti-light leak layer 1650 may be positioned on the second line 1350 but not on the first line 1360. One end of the anti-light leak layer 1650 and one end of the sealing member 1630 may be aligned with each other. One end of the anti-light leak layer 1650 and one end of the sealing member 1630 may be positioned inside the first line 1360. One end of the anti-light leak layer 1650 and one end of the sealing member 1630 may be positioned on the second line 1350. The light blocking layer 410 may be positioned to overlap the first line 1360, or may be positioned inside the first line 1360 not to overlap the first line 1360.

Referring to FIG. 21, a pulse width modulated display voltage (e.g., VGL or VGH) pulse may be applied to the second line 1350 during the touch sensing period. Accordingly, as materials with relatively high permittivity (e.g., liquid crystal LC, light blocking layer 410, sealing member 1630) are positioned to overlap the lines (e.g., the second line 1350, wide line 1510, and link line LL (see FIG. 15)) to which pulse width modulated signals are applied during the touch sensing period, the influence by parasitic capacitance is reduced. In other words, as an effect of the load-free driving, the parasitic capacitance (refer to "Cpara" in FIG. 14) is reduced.

Further, as a low-permittivity material is disposed on the first line 1360 to which no pulse width modulated signal is applied during the touch sensing period or the empty space is filled with air, the influence by the parasitic capacitance due to the first line 1360 is minimized. In other words, the parasitic capacitance (refer to "Cpara'" in FIG. 14) is minimized by lowering the permittivity.

For the above reasons, the touch display device according to embodiments of the disclosure may enhance touch sensing accuracy.

Figure 22A:
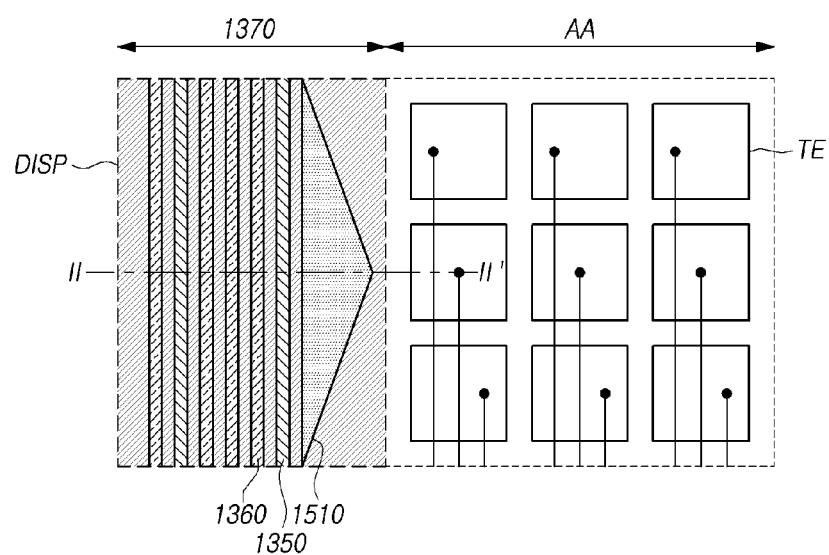
FIGS. 22A and 22B are views illustrating an example in which two or more first lines and two or more second lines are positioned in a non-display area in a touch display device according to embodiments of the disclosure.
Figure 22B:
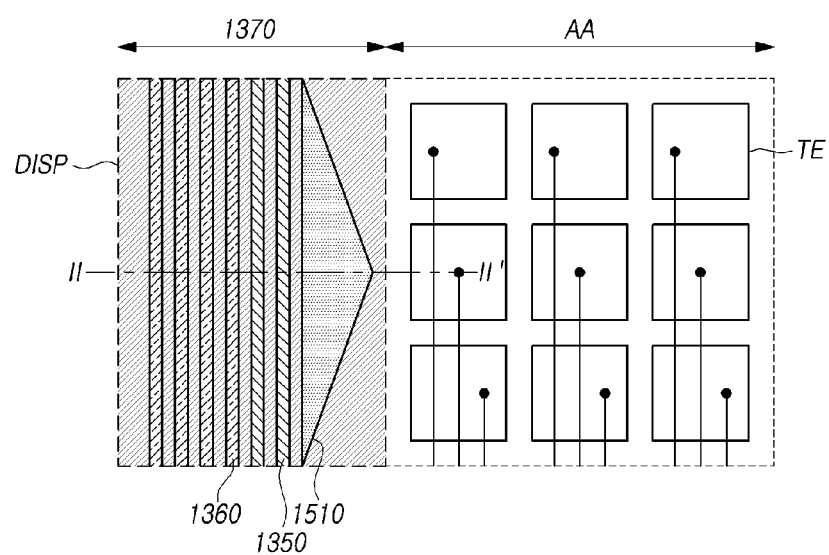

FIGS. 22A and 22B are views illustrating an example in which two or more first lines 1360 and two or more second lines 1350 are positioned in a non-display area in a touch display device according to embodiments of the disclosure.

Referring to FIGS. 22A and 22B, in the touch display device according to embodiments of the disclosure, two or more first lines 1360 and two or more second lines 1350 may be disposed in the LOG area 1370.

In the touch display device according to embodiments of the disclosure, as shown in FIG. 22B, in the LOG area 1370, two or more first lines 1360 may be positioned adjacent to each other and two or more second lines 1350 may be positioned adjacent to each other as.

In the touch display device according to embodiments of the disclosure, as shown in FIG. 22A, in the LOG area 1370, one or more second lines 1350 may be positioned between two or more first lines 1360 or two or more first lines 1360 may be positioned between two or more second lines 1350.

Referring to FIGS. 22A and 22B, the wide line 1510 may be positioned closer to the display area AA than the two or more first lines 1360. The wide line 1510 may be positioned closer to the display area AA than the two or more second lines 1350.

Figure 23A:
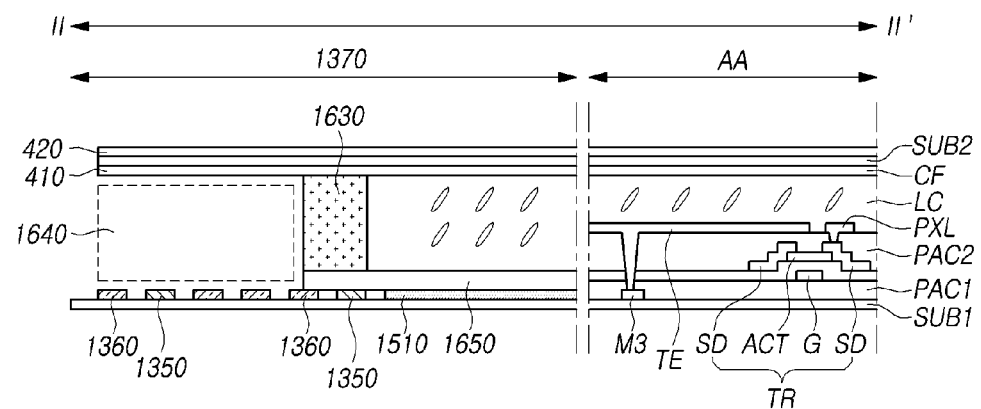
FIG. 23A is a cross-sectional view taken along II-II' of FIG. 22A in a touch display device according to embodiments of the disclosure.
Figure 23B:
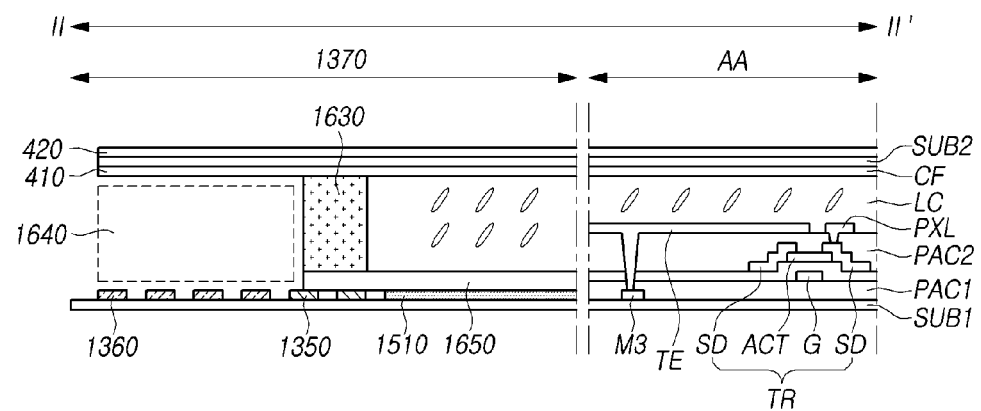
FIG. 23B is a cross-sectional view taken along II-II' of FIG. 22B according to embodiments of the disclosure.

FIG. 23A is a cross-sectional view taken along II-II' of FIG. 22A in a touch display device according to embodiments of the disclosure; and FIG. 23B is a cross-sectional view taken along II-II' of FIG. 22B.

Referring to FIGS. 23A and 23B, at least a portion of the liquid crystal LC having the highest permittivity may be disposed to overlap the wide line 1510. At least a portion of the liquid crystal LC may be disposed to overlap the second line 1350 to which a pulse width modulated signal is input during the touch sensing period.

The sealing member 1630 may be positioned to overlap the wide line 1510 (not shown) and may be positioned to overlap the second line 1350. A portion of the sealing member 1630 may be positioned to overlap the first line 1360.

A low-permittivity material may be positioned in the area 1640 between the first line 1360 and the second substrate SUB2. As described above, the low-permittivity material may be, e.g., air.

Referring to FIGS. 23A and 23B, the light blocking layer 410 may be positioned to overlap the first line 1360, or may be disposed inside the sealing member 1630 not to overlap the first line 1360 (not shown).

The embodiments disclosed in FIGS. 23A and 23B, where the touch display device according to embodiments of the disclosure includes two or more first lines 1360 and two or more second lines 1350, are merely an example, and the disclosure is not limited thereto. For example, when the touch display device includes two or more first lines 1360 and two or more second lines 1350, the embodiments described above in connection with FIGS. 17 to 21 may apply likewise.

Accordingly, the touch display device according to embodiments of the disclosure may significantly enhance touch sensing accuracy in the periphery area The foregoing embodiments are briefly described below.

Embodiments of the disclosure may provide a touch display device 100 comprising a display panel DISP having a plurality of data lines DL, a plurality of gate lines GL, and a plurality of subpixels SP positioned in a display area AA, a plurality of touch electrodes TE positioned to overlap at least one subpixel SP, a touch power circuit TPIC generating and outputting a signal pulse width modulated according to a voltage pulse corresponding to an input pulse width modulation (PWM) signal, a gate driving circuit GDC supplying a scan signal Vgate to the plurality of gate lines GL, a display controller DCTR outputting a gate driving circuit control signal GCS for controlling a driving timing of the gate driving circuit GDC, a first line 1360 positioned in a non-display area 1370 around the display area AA in the display panel DISP and receiving the gate driving circuit control signal GCS, and a second line 1350 positioned in the non-display area 1370, having a width larger than the first line 1360, and receiving the pulse width modulated signal.

Embodiments of the disclosure may provide the touch display device 100, wherein the second line 1350 is positioned adjacent to the first line 1360 and electrically connected with the gate driving circuit GDC.

Embodiments of the disclosure may provide the touch display device 100, further comprising a plurality of link lines LL electrically connecting the gate driving circuit GDC and the plurality of gate lines GL, wherein the second line 1350 is positioned adjacent to the plurality of link lines LL.

Embodiments of the disclosure may provide the touch display device 100, wherein the second line 1350 has a surface inclined in a direction corresponding to a direction in which a link line LL closest thereto among the plurality of link lines LL is disposed.

Embodiments of the disclosure may provide the touch display device 100, wherein the display panel DISP includes a first pin 1330 configured to apply the gate driving circuit control signal GCS to the first line 1360, a second pin 1340 outputting the gate driving circuit control signal GCS applied to the first line 1360, a third pin 1310 configured to apply the pulse width modulated signal to the second line 1350, and a fourth pin 1320 outputting the pulse width modulated signal applied to the second line 1350.

Embodiments of the disclosure may provide the touch display device 100 further comprising a first driving circuit 1120 supplying a touch electrode driving signal TDS identical or corresponding to the pulse width modulated signal to at least one of the plurality of touch electrodes TE during a touch sensing period, and a second driving circuit 1130 including the gate driving circuit GDC, wherein the second driving circuit 1130 further includes a bypass circuit 1520 electrically connecting the third pin 1310 and the fourth pin 1320.

Embodiments of the disclosure may provide the touch display device 100, wherein the display panel DISP includes a first substrate SUB1 where the plurality of subpixels SP and the plurality of touch electrodes TE are positioned, a second substrate SUB2 having a surface where a light blocking layer 410 for separating the plurality of subpixels SP is positioned, and a sealing member 1630 configured to bond the first substrate SUB1 and the second substrate SUB2.

Embodiments of the disclosure may provide the touch display device 100, wherein the sealing member 1630 is positioned to overlap the second line 1350.

Embodiments of the disclosure may provide the touch display device 100, wherein the first line 1360 is positioned outside the sealing member 1630, in an area not overlapping the sealing member 1630.

Embodiments of the disclosure may provide the touch display device 100, wherein the first line 1360 is positioned not to overlap the light blocking layer 410.

Embodiments of the disclosure may provide the touch display device 100 further comprising an anti-light leak layer 1650 positioned on the second layer to overlap the light blocking layer 410.

Embodiments of the disclosure may provide the touch display device 100, wherein the first line 1360 is positioned to overlap the anti-light leak layer 1650.

Embodiments of the disclosure may provide the touch display device 100 further comprising a liquid crystal LC positioned in an area surrounded by the sealing member 1630, between the first substrate SUB1 and the second substrate SUB2, wherein the anti-light leak layer 1650, the liquid crystal LC, and the light blocking layer 410 are positioned on the second line 1350.

Embodiments of the disclosure may provide the touch display device 100, wherein a material positioned in an area between the first line 1360 and the second substrate SUB2 has a smaller permittivity than a permittivity of a material positioned in an area between the second line 1350 and the second substrate SUB2.

Embodiments of the disclosure may provide the touch display device 100 further comprising high-resistance oxide layer (or an oxide film) 420 positioned on another surface of the second substrate SUB2 to overlap the second line 1350.

Embodiments of the disclosure may provide the touch display device 100, wherein the high-resistance oxide layer 420 is positioned to overlap the first line 1360.

Embodiments of the disclosure may provide the touch display device 100, wherein the touch power circuit TPIC generates and outputs display voltage (e.g., VGL or VGH) pulses pulse width modulated according to a voltage pulse corresponding to the input pulse width modulation (PWM) signal, and wherein the gate driving circuit GDC receives the pulse width modulated display voltage (e.g., VGL or VGH) pulses to generate and output the scan signal Vgate.

Embodiments of the disclosure may provide a touch display device 100 comprising a display panel DISP having a plurality of data lines DL, a plurality of gate lines GL, and a plurality of subpixels SP positioned in a display area AA, a plurality of touch electrodes TE positioned to overlap at least one subpixel SP, a touch power circuit TPIC outputting a signal pulse width modulated according to a voltage pulse corresponding to an input pulse width modulation signal and a display signal, a gate driving circuit GDC receiving the display signal to generate and output a scan signal Vgate supplied to the plurality of gate lines GL, a display controller DCTR outputting a gate driving circuit control signal GCS for controlling a driving timing of the gate driving circuit GDC, a first line 1360 positioned in a non-display area 1370 around the display area AA in the display panel DISP and receiving the gate driving circuit control signal GCS, and a second line 1350 positioned in the non-display area 1370, having a width larger than the first line 1360, and receiving the pulse width modulated signal or the display signal.

Embodiments of the disclosure may provide the touch display device 100, wherein the display panel DISP includes a first substrate SUB1 where the plurality of subpixels SP and the plurality of touch electrodes TE are positioned, a second substrate SUB2 having a surface where a light blocking layer 410 for separating the plurality of subpixels SP is positioned, and a sealing member 1630 configured to bond the first substrate SUB1 and the second substrate SUB2, and wherein the sealing member 1630 is positioned to overlap the second line 1350.

Embodiments of the disclosure may provide the touch display device 100, wherein a material positioned in an area between the first line 1360 and the second substrate SUB2 has a smaller permittivity than a permittivity of a material positioned in an area between the second line 1350 and the second substrate SUB2.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A touch display device, comprising:
a display panel including a plurality of data lines, a plurality of gate lines, a plurality of subpixels in a display area of the display panel, and a plurality of touch electrodes that overlap at least one subpixel from the plurality of subpixels;
a touch power circuit configured to generate and output a signal pulse width that is modulated according to a voltage pulse, the voltage pulse corresponding to an input pulse width modulation signal;
a gate driving circuit configured to supply a scan signal to the plurality of gate lines;
a display controller configured to output a gate driving circuit control signal, the gate driving circuit control signal controlling a driving timing of the gate driving circuit;
a first line in a non-display area of the display panel, the first line receiving the gate driving circuit control signal; and
a second line in the non-display area, and including a first type second line and a second type second line having a width that is larger than the first type second line, the second line receiving the signal pulse width,
wherein a width of the second type second line is larger than a width of the first line,
wherein the display panel includes:
a first substrate on which the plurality of subpixels and the plurality of touch electrodes are disposed;
a second substrate facing the first substrate; and
a sealing member configured to bond together the first substrate and the second substrate, and
wherein at least one side of the first type second line and a side of the second type second line extend in parallel to each other, and the sealing member does not overlap with the first type second line adjacent to the sealing member and overlaps with a part of the second type second line adjacent to the sealing member.

2. The touch display device of claim 1, wherein the second type second line is adjacent to the first line and electrically connected with the gate driving circuit.

3. The touch display device of claim 1, further comprising:
a plurality of link lines electrically connecting the gate driving circuit and the plurality of gate lines,
wherein the second type second line is adjacent to the plurality of link lines.

4. The touch display device of claim 3, wherein the second type second line has a surface that is parallel to a link line from among the plurality of link lines that is closest to the second type second line such that the surface is inclined.

5. The touch display device of claim 1, wherein the display panel includes:
a first pin configured to apply the gate driving circuit control signal to the first line;
a second pin configured to output the gate driving circuit control signal applied to the first line;
a third pin configured to apply the signal pulse width that is modulated according to the voltage pulse to the second type second line; and
a fourth pin configured to output the signal pulse width applied to the second type second line.

6. The touch display device of claim 5, further comprising:
a first driving circuit configured to supply a touch electrode driving signal that corresponds to the signal pulse width that is modulated according to the voltage pulse to at least one of the plurality of touch electrodes during a touch sensing period; and
a second driving circuit including the gate driving circuit, wherein the second driving circuit further includes a bypass circuit that is configured to electrically connect the third pin and the fourth pin.

7. The touch display device of claim 1, wherein the display panel includes:
a first substrate, wherein the plurality of subpixels and the plurality of touch electrodes on the first substrate;
a second substrate, wherein a light blocking layer that separates the plurality of subpixels is on the second substrate.

8. The touch display device of claim 7, wherein the first line is non-overlapping with the sealing member.

9. The touch display device of claim 7, wherein the first line is non-overlapping with the light blocking layer.

10. The touch display device of claim 7, further comprising:
an anti-light leak layer on the first substrate, the anti-light leak layer overlapping the light blocking layer.

11. The touch display device of claim 10, wherein the first line overlaps the anti-light leak layer.

12. The touch display device of claim 10, further comprising:
a liquid crystal in an area surrounded by the sealing member, the liquid crystal between the first substrate and the second substrate,
wherein the anti-light leak layer, the liquid crystal, and the light blocking layer overlap the second line.

13. The touch display device of claim 7, wherein a material positioned in an area between the first line and the second substrate has a permittivity that is less than a permittivity of a material in an area between the second line and the second substrate.

14. The touch display device of claim 7, further comprising:
an oxide film on a different surface of the second substrate than the light blocking layer, the oxide film overlapping the second line.

15. The touch display device of claim 14, wherein the oxide film overlaps the first line.

16. The touch display device of claim 1, wherein the part of the second type second line overlapping with the sealing member is located between parts not overlapping the sealing member.

17. The touch display device of claim 1, wherein the touch power circuit is further configured to generate and output display voltage pulses that are pulse width modulated according to the voltage pulse that corresponds to the input pulse width modulation signal, and
wherein the gate driving circuit receives the pulse width modulated display voltage pulses and generates and outputs the scan signal using the pulse width modulated display voltage pulses.

18. The touch display device of claim 1, wherein the second type second line has a tapered V-shape, an inclined surface, vertices which have been trimmed to be not sharp but blunt, or a polygonal shape.

19. A touch display device comprising:
a display panel including a plurality of data lines, a plurality of gate lines, a plurality of subpixels in a display area of the display panel, and a plurality of touch electrodes that overlap at least one subpixel from the plurality of subpixels;

one or more signal generating circuits configured to generate a first signal for display driving during a display period that is not pulse width modulated and one or more second signals that are pulse width modulated for touch sensing during a touch sensing period and the display driving during the display period;

a first line in a non-display area of the display panel, the first line receiving the first signal that is not pulse width modulated; and a second line in the non-display area of the display panel, and including a first type second line and a second type second line having a width that is larger than the first type second line, the second line receiving a second signal from the one or more second signals that is pulse width modulated, wherein a width of the second type second line is wider than a width of the first line, wherein the display panel includes:
a first substrate on which the plurality of subpixels and the plurality of touch electrodes are disposed;
a second substrate facing the first substrate; and
a sealing member configured to bond together the first substrate and the second substrate, and
wherein at least one side of the first type second line and a side of the second type second line extend in parallel to each other, and the sealing member does not overlap with the first type second line adjacent to the sealing member and overlaps with a part of the second type second line adjacent to the sealing member.

20. The touch display device of claim 19, wherein the second signal is one of a pulse width modulated common voltage applied to the plurality of touch electrodes during the display period or a pulse width modulated display voltage applied to the second line during the touch sensing period, and wherein the first signal includes a gate driving control signal based upon which gate signals are generated by a gate driving circuit included in the one or more signal generating circuits, the gate signals applied to the plurality of gate lines during the display period.

21. The touch display device of claim 19, wherein the second type second line includes a first part and a second part, the second part having the width that is wider than the width of the first line.

22. The touch display device of claim 21, wherein the first part of the second type second line is between the first line and the second part of the second line in a plan view of the touch display device.

23. The touch display device of claim 19, wherein the second type second line has a tapered V-shape, an inclined surface, vertices which have been trimmed to be not sharp but blunt, or a polygonal shape.

* * * * *